US012737433B2

(12) United States Patent
Ren et al.

(10) Patent No.: US 12,737,433 B2
(45) Date of Patent: Sep. 15, 2026

(54) TECHNIQUES FOR DATA CLUSTERING AND OUTCOME GENERATION USING A MACHINE-LEARNED ARCHITECTURE

(71) Applicant: OPTUM, INC., Minnetonka, MN (US)

(72) Inventors: Sheng Ren, Irvine, CA (US); Michael P. Lahm, Minneapolis, MN (US); Lilian Z. Lingcaro, Mandaue (PH)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/941,802

(22) Filed: Nov. 8, 2024

(65) Prior Publication Data

US 2026/0134062 A1 May 14, 2026

(51) Int. Cl.
*G06F 18/23* (2023.01)
*G06F 18/213* (2023.01)

(52) U.S. Cl.
CPC ............ *G06F 18/23* (2023.01); *G06F 18/213* (2023.01)

(58) Field of Classification Search
CPC ............................... G06F 18/23; G06F 18/213
See application file for complete search history.

(56) References Cited

U.S. PATENT DOCUMENTS 11,257,579 B2 2/2022 Purushothaman et al.
11,373,732 B2 6/2022 Aliper et al.
11,521,724 B2 12/2022 Das et al.
2003/0078739 A1* 4/2003 Norton .................... G06F 18/00 702/22
2021/0304895 A1 9/2021 Buscemi et al.
2021/0366577 A1 11/2021 Koller et al.
2022/0028488 A1 1/2022 Rubin et al.
2022/0125386 A1 4/2022 Marras et al.
2022/0375609 A1 11/2022 Guo et al.
(Continued)

FOREIGN PATENT DOCUMENTS

WO WO-2022261192 A1 12/2022
WO WO-2023212563 A1 11/2023

OTHER PUBLICATIONS

Leventhal et al., "An interpretable machine learning pipeline based on transcriptomics predicts phenotypes of lupus patient," *iScience* (2023).

(Continued)

*Primary Examiner* — Khanh B Pham
(74) *Attorney, Agent, or Firm* — MARSHALL, GERSTEIN & BORUN LLP

(57) ABSTRACT

Techniques for data clustering and outcome generation may comprise determining a state sequence associated with a sample of one or more samples that satisfies an occurrence threshold and generating one or more timing features for the state sequence. The techniques may further comprise clustering, by executing a machine-learned model, the sample corresponding to at least the state sequence into a cluster of a set of clusters based on the state sequence and the one or more timing features. The techniques may further comprise generating a data object indicating one or more outcomes associated with the cluster that includes the sample. These data objects indicate outcomes that are specific enough to provide meaningful insights contained in associations between the input data and the associated clusters and eliminate/reduce the misleading information commonly output by typical techniques.

20 Claims, 6 Drawing Sheets

(56) References Cited

U.S. PATENT DOCUMENTS

| | | | | |
|---|---|---|---|---|
| 2023/0050513 | A1 | 2/2023 | Morganella et al. | |
| 2024/0028925 | A1* | 1/2024 | Kuduva | G06N 20/20 |
| 2024/0047072 | A1* | 2/2024 | Haddad | G16H 40/67 |
| 2024/0212864 | A1* | 6/2024 | Lerner | G16H 50/20 |
| 2024/0324965 | A1* | 10/2024 | Wexler | G16H 50/30 |
| 2024/0378510 | A1* | 11/2024 | Potukuchi | G06N 20/20 |
| 2024/0420326 | A1* | 12/2024 | Witowski | G16H 10/60 |

OTHER PUBLICATIONS

Meloni et al., "Clustering Intermedia Patients Using Cardiovascular Magnetic Resonance," *Journal of Clinical Medicine*, (2023).

Holmes et al., "Phenotyping the Patient Journey," Metabolic Phenotyping in Personalized and Public Healthcare, pp. 49-74 (2016).

Qin E Al., "T-Phenotype: Discovering Phenotypes of Predictive Temporal Patterns in Disease Progression," International Conference on Artificial Intelligence and Statistics (2023).

Shivade et al., "A review of approaches to identifying patient phenotype cohorts using electronic health records," Journal of the American Medical Informatics Association, 21(2), pp. 221-230 (2014).

Thompson et al., Linking Electronic Health Records to Better Understand Breast Cancer Patient Pathways Within and Between Two Health Systems, eGEMs, (2015).

Landi et al., "Deep representation learning of electronic health records to unlock patient stratification at scale," NPJ digital medicine, 3(1) (2020).

Rasmy et al., "Med-BERT: pretrained contextualized embeddings on large-scale structured electronic health records for disease prediction," NPJ digital medicine, 4(1) (2021).

Lee et al., "BioBERT: a pre-trained biomedical language representation model for biomedical text mining," Bioinformatics, 36(4) pp. 1234-1240 (2020).

Pei et al., "Mining sequential patterns by pattern-growth: The prefixspan approach," IEEE Transactions on Knowledge and Data Engineering, 16(11), pp. 1424-1440 (2004).

They Do webpage, 11 pages, downloaded Sep. 22, 2025, available at <https://www.theydo.com/industries/healthcare?utm_content=us-core_patient-journey-mapping&gclid=EAIaIQobChMIkZvZkdeFgAMVz2xvBB2iEgnmEAMYASAAEgKR-QvD_BwE>.

* cited by examiner

| | indv_sys_id | days_after_index | states |
|---|---|---|---|
| 1 | 18467839 | 0 | s_46 |
| 2 | 18467839 | 18 | s_49 |
| 3 | 18467839 | 32 | s_41 |
| 4 | 18467839 | 39 | s_46 |
| 5 | 18475245 | 0 | s_08 |
| 6 | 18475245 | 15 | s_34 |
| 7 | 18475245 | 30 | s_34 |

| | id | S_00_ptrn | S_00_ptrn_initial_timing | S_00_ptrn_freq | S_00_ptrn_duration |
|---|---|---|---|---|---|
| 1 | 1887352425 | null | null | null | null |
| 2 | 1900246405 | 1 | 29 | 2 | 0 |
| 3 | 1930463351 | 1 | 4 | 10 | 0 |
| 4 | 1940166889 | 1 | 14 | 12 | 0 |
| 5 | 1940610874 | null | null | null | null |
| 6 | 1942181054 | null | null | null | null |
| 7 | 1958062004 | 1 | 2 | 24 | 0 |

TECHNIQUES FOR DATA CLUSTERING AND OUTCOME GENERATION USING A MACHINE-LEARNED ARCHITECTURE

TECHNICAL FIELD

The present disclosure generally relates to data clustering and outcome generation, and more particularly, to clustering samples into clusters based on event combinations/sequences of the samples and timing features of the event combinations/sequences to facilitate generation of interpretable outcomes of interest for the samples.

BACKGROUND

Techniques for predicting outcomes based on historical data suffer from notable drawbacks. Namely, conventional techniques generally lack an analytical framework sufficient to provide interpretable insights and may generate predictions that aren't accurate or that vary in accuracy across different sub-types of historical data. Currently, techniques for predicting outcomes based on historical data suffer from either (1) providing a purely descriptive approach that isn't generalizable to multiple historical data domains, which in turn leads to high variability in prediction accuracy across different types of historical data; or (2) lacking sufficient output interpretability to determine whether a prediction for a particular input data set is accurate for that particular data set and/or how variations of that particular input data affect the output predicted in comparison to other input data.

BRIEF DESCRIPTION OF THE DRAWINGS

The figures described below depict embodiments for purposes of illustration only. One skilled in the art will readily recognize from the following discussion that alternative embodiments of the systems and methods illustrated herein may be employed without departing from the principles of the disclosure described herein. The detailed description is described with reference to the accompanying figures. In the figures, the same reference number appearing in different figures indicates a same or similar item.

DETAILED DESCRIPTION

Figure 1:
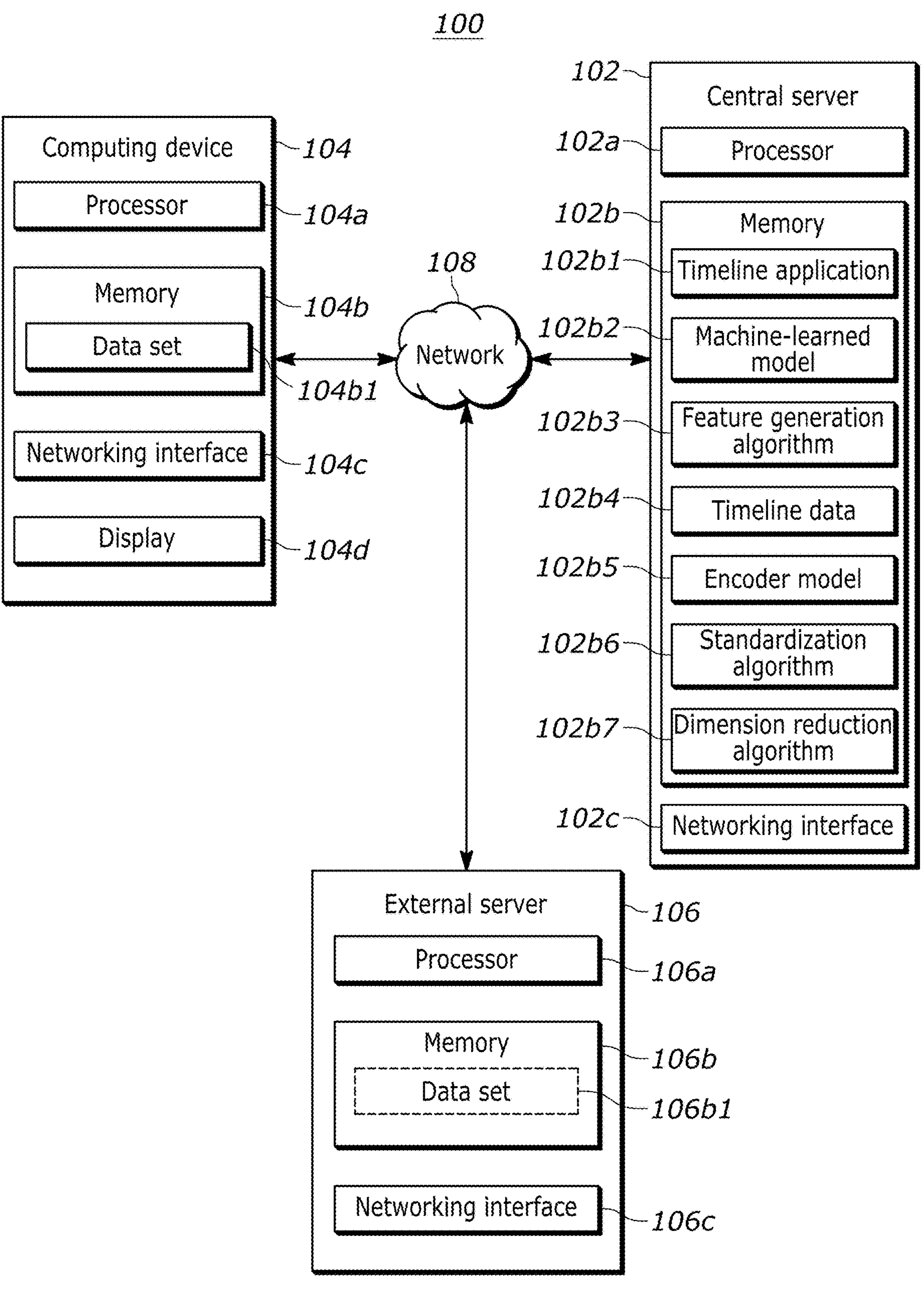
FIG. 1 depicts an example computing system in which various embodiments of the present disclosure may be implemented.

Broadly speaking, the data clustering and outcome generation techniques of the present disclosure accurately determine interpretable outcomes of interest (e.g., a set of event series and probability(ies) associated therewith indicating a respective event series that is likely to achieve a positive patient health outcome or indicating the likelihood that one or more of a set of outcomes will occur as a result of the event series, a set of treatment timeline(s) and value(s) associated therewith). More specifically, the techniques of the present disclosure determine state sequences and generate timing features using a feature generation algorithm and apply a machine-learned model to samples and their associated state sequences and timing features to generate clusters/subclusters of the samples. The techniques of the present disclosure may then generate outcomes of interest (e.g., including predicted timelines) and/or data objects indicating the same. The techniques of the present disclosure improve upon conventional data clustering and outcome generation techniques at least by generating more accurate and interpretable outputs than such conventional techniques.

As referenced herein, an "event" refers to a single instance of an action occurring at a particular time, such as an individual medical event (e.g., drug prescription, medical provider interaction, condition diagnosis). Of course, more than one event may occur at a particular time (e.g., an individual medical visit including multiple events). An "event combination" generally is, and/or otherwise indicates, one or more events collectively occurring at a particular time (e.g., a single visit to a clinician). An "event sequence" refers to a sequence of one or more event combinations occurring at one or more particular times and may thereby include multiple different event combinations. For example, a first event sequence may include a first event and a second event occurring at a first time (e.g., a first event combination) and may include a third event occurring at a second time (e.g., a second event combination). As another example, a second event sequence may include a fourth event at a third time. Moreover, as referenced herein a "sample" refers to an event sequence associated with a patient, claim, provider, and/or other data that includes one or more sequences/subsequences of events for clustering into one or more clusters/subclusters.

Further, a "state" refers to a group/cluster of event combinations determined according to the techniques discussed herein to be similar (e.g., contextually similar). One or more event combinations included as part of the state may include additional events, different events, and/or alternative sequences of the same events. A "state sequence" refers to a sequence of one or more states that may include event combinations that are included as part of an event sequence for one or more samples.

For example, a state may include and/or otherwise indicate a group/cluster of event combinations wherein 50 of the event combinations include events comprising a lower back pain diagnosis, an opioid prescription, and chiropractic therapy, to give a simple and non-limiting example. Another event combination included as part of this state may not include these exact events but may include each of the lower back pain diagnosis, opioid prescription, and chiropractic therapy separated by intervening events and/or out of order relative to the other 50 event combinations included as part of the state. Yet another event combination included as part of the state may not include the exact same events and may further not include the opioid prescription entirely. Instead, this event combination may only include a lower back pain diagnosis followed by a chiropractic therapy event. Both of these event combinations may nevertheless be part of the state because they include events that are similar to the other 50 event combinations in the state, as determined by the techniques discussed herein.

Moreover, although the discussion herein predominantly discusses healthcare as one example, it is understood that the techniques discussed herein may be applied to cybersecurity, hardware and/or software provisioning in a computing environment, and/or the like. In such an example, the event combination may comprise events such as a type of execution that occurred at a computing device and a time the execution occurred, an indication that particular hardware or software was installed or instantiated and a time of the installation/instantiation, a configuration change (e.g., change to permission, registry key, pointer, flag, software version, hardware component) and a time of the configuration change, a computing state change (e.g., change to network connection and/or state, resource availability, power state, temperature, memory, clock speed) and the time the state changed, etc. In such an example, the event combination may be associated with one or more hardware components, one or more software components, one or more computing devices, one or more computing environments (e.g., server cluster(s), cloud region(s)).

Conventional techniques for predicting outcomes based on historical data suffer from several notable drawbacks. Such conventional techniques generally lack an analytical framework sufficient to provide interpretable predictions or insights and may generate predictions that are inaccurate or vary in accuracy across different sub-types of historical data.

For example, many conventional techniques provide a purely descriptive approach that is not generalizable to multiple historical data domains and/or lack sufficient output interpretability to determine whether a prediction for a particular input data set is accurate for that particular data set. As previously mentioned, generating a timeline associated with a sample (e.g., a patient, computing system) generally includes three elements: (1) events (e.g., medical events), (2) the order and timing of the events, and (3) event sequence data from groups of patients having similar event combinations/sequences (e.g., phenotypes). Medical events typically include actions or services performed for a patient when interacting with a healthcare system, including diagnosis, procedures, medication prescription or administration, lab tests, and/or questionnaires, among others. Timeline generally references the order and timing of the events, and the event sequence data from groups of patients generally refers to a collection of similar event sequence(s) that may be used to predict a future event sequence/timeline given patient data and/or an event timeline associated with the patient, a probability that an event and/or event sequence will occur (i.e., a predicted event and/or predicted event sequence/timeline), an estimated value associated with the predicted event and/or or predicted event sequence, and/or the like.

The number of possible events and resulting timelines and/or phenotypes may be large enough that a purely descriptive approach is generally insufficient. For example, such a purely descriptive approach is determining a type of an event that occurred for each event and recording how many events of different types occurred. Techniques relying on such a purely descriptive approach cannot provide a general-purpose solution to the problem because each analytical step is a domain-dependent manual effort. Practically speaking, the overwhelming number of events and potential complexities of comorbidity, differences between event sequences between patients, etc. creates an unsolvable problem for such techniques. In other words, picking/identifying important events timeline(s) associated with an outcome of interest among such a vast number of data points cannot be performed by a purely descriptive approach.

Further, techniques employing deep learning can suffer from a lack of interpretability and accuracy. As another example in the healthcare industry, some techniques train deep learning models to predict outcomes of interest by utilizing embeddings of a patient's events timeline information. However, such deep learning models do not provide any insight into how such a prediction was generated, which factor(s) in a patient's event sequence or in other patients' event sequences most affected the output, and/or the like. These outputs generally lack the granularity necessary to (1) distinguish shared timelines of similar samples/patients, (2) determine relationships between/among patients and/or groups of patients, and/or (3) determine causal relationships between/among the timing and order of events/events sequences and outcomes of interest. Accordingly, these conventional techniques lack interpretability, as the outputs are generally either (1) too broad to provide meaningful insights contained in associations between the input data and the associated groupings of patients and/or (2) provide misleading information for decision making stemming from the lack of specificity. Moreover, the accuracy of such models may vary widely between types of event sequences.

By contrast, the techniques of the present disclosure generate data objects indicating outcomes of interest (e.g., predicted timelines), in part, by receiving and/or generating/determining (responsive to indication(s) received from a computer) a state sequence, generating timing features for the state sequence using a feature generation algorithm, and applying a machine-learned model to a sample corresponding to the state sequence to cluster/subcluster the sample into a cluster of a set of clusters based on the state sequence and the timing features. At least these elements improve upon conventional techniques for multiple reasons.

As one example, the feature generation algorithm identifying a state sequence and generating timing features provides specific inputs for the machine-learned model to avoid the interpretability and accuracy issues of conventional techniques. Namely, the state sequence and timing features identified/generated by the feature generation algorithm include highly granular details relating to specific event sequences and timings of at least two or more events for each event sequence of an entity/patient. These inputs enable the machine-learned model to create clear associations between/among the correspondingly granular event sequences and/or features of samples when clustering the samples. Moreover, the clusters/subclusters determined by the machine-learned model (according to the techniques discussed herein) include sufficient granularity to readily (1) distinguish shared timelines of entities/patients within each cluster, (2) determine relationships between/among individual clusters, and (3) determine causal relationships between/among the timing and order of events/events sequences and outcomes of interest. As a result, the data objects generated by the present techniques indicate outcomes (e.g., predicted timelines) that are specific enough to provide meaningful insights contained in associations between the input data (e.g., samples) and the associated clusters and eliminate/reduce any misleading information typically output by conventional techniques. This degree of interpretability and accuracy is not achievable using conventional techniques, such that the present techniques clearly improve upon these conventional techniques.

As another example, the feature generation algorithm and machine-learned model configuration of the present techniques provide a general-purpose solution to the entity/patient events timeline phenotyping problem. Unlike conventional techniques, the algorithms/models of the present techniques are capable of efficiently interpreting an arbitrary number or type of possible events and resulting timelines and/or phenotypes included in the input states. The present techniques are therefore capable of identifying important events timeline(s) (e.g., a data object indicating a predicted timeline) associated with an outcome of interest among arbitrarily large numbers of input events, which was previously unachievable by conventional techniques utilizing purely descriptive approaches.

The techniques of the present disclosure thus improve the functionality of a computing device (e.g., a hosting server such as a central server) at least by clustering and generating data in a particular way to enhance the accuracy and interpretability provided by the machine-learned model and/or the computing device. The feature generation algorithm and machine-learned model, executing on the computing device, determine state sequences and generate timing features to create clear associations with metrics/outcomes of interest (e.g., associated with input samples/medical patients) that were not created as part of conventional techniques. That is, the present disclosure describes improvements in the functioning of the computer itself because the computing device more accurately analyzes/clusters data as a direct result of the feature generation algorithm and machine-learned model and realizes improved variability in accuracy across different data sets. This is an improvement over other techniques at least because existing systems typically include a purely descriptive approach, lacking interpretability and generalizability, and/or are otherwise unable to cluster data and/or generate predictions with the accuracy and interpretability resulting from the feature generation algorithm and machine-learned model.

Still further, the present disclosure includes specific features other than what is well-understood, routine, conventional activity in the field, or adding unconventional steps that demonstrate, in various embodiments, particular useful applications, e.g., applying, by one or more processors, a feature generation algorithm to one or more states that represent event combinations associated with one or more samples, wherein applying the feature generation algorithm includes: determining a state sequence associated with a sample of the one or more samples that satisfies an occurrence threshold, the state sequence including a state from the one or more states, and generating one or more timing features for the state sequence; and/or clustering, by the one or more processors executing a machine-learned model, the sample associated with the state sequence into a cluster of a set of clusters based on the state sequence and the one or more timing features, among others.

Of course, it should be appreciated that the advantages and technical improvements described above and elsewhere herein are not the only advantages and/or technical improvements that may be realized as a result of the techniques described herein. Other advantages and/or technical improvements to the functioning of a computer itself or other technologies or technical fields may be apparent to one of ordinary skill in the art. Moreover, while described herein primarily in the health care context, the techniques described herein may be readily applied in any suitable field for any suitable purpose.

Example Computing System

FIG. 1 depicts an example computing system 100 in which various embodiments of the present disclosure may be implemented. Depending on the embodiment, the example computing system 100 may generate state sequences and timing features, cluster data (e.g., samples), standardize data, generate embeddings, identify states, and/or any related values or combinations thereof. Of course, it should be appreciated that, while the various components of the example computing system 100 (e.g., central server 102, computing device 104, external server 106) are illustrated in FIG. 1 as single components, the example computing system 100 may include multiple (e.g., dozens, hundreds, thousands) of computing devices 104 and external servers 106 that are simultaneously connected to the network 108 at any given time.

Generally, the example computing system 100 includes a central server 102, a computing device 104, and an external server 106. Each of the central server 102, the computing device 104, and the external server 106 may communicate with the other devices (e.g., transmit data, instructions, etc.) across the network 108. As an example, the central server 102 and/or the external server 106 may belong to a healthcare provider or hospital and the computing device 104 may belong to a patient of the healthcare provider or hospital. In this example, the patient using the computing device 104 may transmit data (e.g., data set **104*b*1 including a sample(s)) to the central server 102, and the server 102 may execute a timeline application 102*b*1 to generate data objects indicating one or more outcomes of interest (e.g., a predicted timeline) based on the data set 104*b*1. The central server 102 may additionally or alternatively make the data object accessible to the patient via the computing device 104**, so the patient may review the data object to review the outcomes of interest, schedule an appointment with a healthcare provider, initiate remedial or therapeutic actions, and/or any other suitable actions or combinations thereof.

More specifically, the central server 102 may include one or more processors **102*a*, a memory 102*b*, and a networking interface 102*c*. The memory 102*b* may store executable instructions that are configured to, when executed by the one or more processors 102*a*, cause the one or more processors 102 *a* to analyze data (e.g., data set 104*b*1, 106*b*1) received at the central server 102 and output various values (e.g., data objects indicating predicted timelines). The timeline application 102*b*1, the machine-learned model 102*b*2, the feature generation algorithm 102*b*3, the timeline data 102*b*4, the encoder model 102*b*5, the standardization algorithm 102*b*6, and the dimension reduction algorithm 102*b*7 may all include such executable instructions, as well as other data. The memory 102*b* may additionally or alternatively store additional data and/or databases. It should be appreciated that the central server 102** can include one or multiple computing devices that are co-located or distributed.

The central server 102 may receive data set **104*b*1 from the computing device 104 connected to the server 102 through a network 108 and processes the data set 104*b*1 in accordance with one or more sets of instructions stored in a memory 102*b* to output any of the values described herein. The central server 102 may execute the timeline application 102*b*1, which in turn, may access and apply the machine-learned model 102*b*2, the feature generation algorithm 102*b*3, the timeline data 102*b*4, the encoder model 102*b*5, the standardization algorithm 102*b*6, and/or the dimension reduction algorithm 102*b*7 to the data set 104*b*1. The data set 104*b*1** (also referenced herein as a "sample") may generally include user identification information, a plurality of events, a plurality of time features, claims data, a plurality of user identification information, and/or other data corresponding to, for example, a patient's recent physician visit or a claim corresponding to the visit. In certain embodiments, the user identification information is/are patient IDs, the claims data are medical claims, the events are medical events, and/or the time features include time stamps corresponding to the medical events.

For example, the data set **104*b*1 may include a set of medical events for a first patient, such as a condition diagnosis for low-back pain. The data set 104*b*1 may additionally or alternatively include, in this example, multiple treatments prescribed/performed for the condition diagnosis (e.g., chiropractic therapy), medications prescribed/taken for the condition diagnosis (e.g., opioid prescription), lab tests performed for the condition diagnosis (e.g., complete blood count (CBC)), and/or other medical events associated with the condition diagnosis (e.g., recommendation in physician visit notes to avoid lifting objects over 20 pounds for 6 weeks). Further in this example, the data set 104*b*1** may include time stamps (e.g., date/time values) or other timing data corresponding to each of the medical events and an identification value associated with the first patient.

In another example, the data set **104*b*1 may include a set of medical events corresponding to the first patient and a second patient. In this example, the data set 104*b*1 may additionally or alternatively include time stamps or other timing data for each of the medical events and an identification value associated with the first patient and the second patient. The first patient may have an entry in the data set 104*b*1 indicating a condition diagnosis for low-back pain, and the second patient may have an entry in the data set 104*b*1 indicating a condition diagnosis for chronic migraines. Each of the entries in the data set 104*b*1 corresponding to the low-back pain condition diagnosis may include a time stamp and the identification value of the first patient. Moreover, each of the entries in the data set 104*b*1 corresponding to the chronic migraines condition diagnosis may include a time stamp and the identification value of the second patient. In this manner, the central server 102 can identify events related to each patient and standardize the data set 104*b*1**, as described herein.

In certain embodiments, the data included in the data set **104*b*1 is or includes a text string, an audio stream, a video stream, a file, a document, and/or any other suitable data/datatype(s) or combinations thereof. Accordingly, in these embodiments, the data set 104*b*1** is or includes a set of such text strings, audio streams, video streams, files, documents, and/or any other suitable data/datatype(s) or combinations thereof.

The timeline application **102*b*1 may receive the data set 104*b*1 and generates data objects indicating one or more outcomes of interest (e.g., predicted timelines) for one or more samples included therein by accessing/applying the feature generation algorithm 102*b*3, the machine-learned model 102*b*2, the encoder model 102*b*5, the standardization algorithm 102*b*6, and/or the dimension reduction algorithm 102*b*7 to the data set 104*b*1**. The outcomes of interest for a sample may generally indicate/represent a predicted events sequence based on a cluster in which the sample is included.

The feature generation algorithm **102*b*3 analyzes one or more states to determine a corresponding state sequence that satisfies an occurrence threshold and a set of timing features associated with the state sequence. The occurrence threshold may correspond to a number of times a state sequence occurs and/or is otherwise observed within a set of samples (e.g., for multiple patients), and may generally be any suitable value (e.g., 2, 3, 5, 10) depending on, e.g., the types of data included in the. The machine-learned model 102*b*2 then utilizes the data set 104*b*1, state sequence(s) satisfying the occurrence threshold, and timing features associated with the state sequence(s) as inputs to generate clusters and/or subclusters of the data. With the clusters and/or subclusters, the timeline application 102*b*1 generates data objects indicating the one or more outcomes of interest associated with the sample (e.g., included in data set 104*b*1**) based on the cluster/subcluster in which the sample is included.

The central server 102 may further include an encoder model **102*b*5 that may be configured to generate embeddings of unique event combinations input into the model 102*b*5. Generally, the embedding generation process may involve a machine-learned model (e.g., encoder model 102*b*5) identifying/extracting features or attributes from the input data, such as by identifying significant words or phrases (e.g., "opioid", "diagnosis", "physical therapy") within the events combination data. The machine-learned model may then convert these features/attributes into n-dimensional numerical vectors or tensors that indicate a location in the n-dimensional embedding space. These n-dimensional vector representations can be high-dimensional (e.g., hundreds, thousands of dimensions), which may place high demands on processing/memory resources tasked with analyzing/storing such embeddings. Accordingly, the timeline application 102*b*1** may additionally or alternatively apply dimensionality reduction techniques, such as Principal Component Analysis (PCA) or t-Distributed Stochastic Neighbor Embedding (t-SNE), to the generated embeddings to reduce the number of dimensions, and thereby minimize the processing/memory demands, while preserving meaningful relationships within the data.

The central server 102 may further include a standardization algorithm **102*b*6 that may be configured to standardize event data for one or more samples, e.g., from a non-standard format to a standardized format. For example, standardizing the event data may include normalizing one or more values contained therein, such as scores or reported values that have different ranges (e.g., from the different ranges to a normalized 0 to 1 scale, Z-score standardization to have a mean of 0 and a standard deviation of 1). As another example, the standardization algorithm 102*b*6 may include converting data types, such as converting text labels (e.g., diagnosis codes) into numerical values to facilitate numerical analysis. Additionally, or alternatively, the standardization algorithm 102*b*6** may include extracting data of a first type from data of a second type (e.g., using OCR, a computer vision machine-learned model), automated data cleaning, handling missing values within the data (e.g., inputting missing data with a predictive machine-learned model), and/or any other suitable standardization techniques or combinations thereof.

The central server 102 may further include a dimension reduction algorithm **102*b*7 configured to reduce the dimension of an embedding generated by, e.g., the encoder model 102*b*5. The dimension reduction algorithm 102*b*7 may generally reduce the dimension of an embedding by identifying features or direction within the data indicated by the embedding that may capture a significant amount of the variance or information represented thereby. For example, where the dimension reduction algorithm 102*b*7 includes a Principal Component Analysis (PCA) technique, the algorithm 102*b*7 may calculate a covariance matrix for an embedding that captures the variance/covariance of features represented by the embedding. The algorithm 102*b*7 may then perform eigenvalue decomposition on the covariance matrix to determine eigenvalues/eigenvectors, and may then determine which eigenvectors (i.e., principal components) associated with eigenvalues of sufficient size/magnitude to serve as the new basis of the data represented by the embedding. The algorithm 102*b*7** may then project the embeddings onto the principal components to reduce the embedding's dimension without sacrificing the highest variance (i.e., where the data varies the most) information.

More generally, the computing device 104 may be or include any one or more devices that is associated with (e.g., owned and/or operated by) one or more entities that may provide data (e.g., data set **104*b*1 or a portion thereof) that is transmitted to and/or is otherwise accessible by the central server 102 and/or the external server 106 through the network 108. In certain embodiments, the data set 104*b*1 transmitted to and/or otherwise accessible by the central server 102 and/or the external server 106 is or includes a set of event sequences including events associated with the user of the computing device 104 to be evaluated by the central server 102 and/or the external server 106. In some embodiments, the computing device 104 is a server or collection of servers hosting the data set 104*b*1 or a portion thereof, e.g., since the data set 104*b*1 may comprise data subsets received from different computing devices. However, in certain embodiments, the computing device 104 is a personal computing device of that entity/user, such as a smartphone, a tablet, smart glasses, or any other suitable device or combination of devices (e.g., a smart watch plus a smartphone) with wireless communication capability. In the embodiment of FIG. 1, the computing device 104 includes a processor 104*a*, a memory 104*b*, a networking interface 104*c*, and a display 104*d*. The memory 104*b* stores the data set 104*b*1**.

The computing device 104 may be communicatively coupled to the central server 102 and/or the external server 106. For example, the computing device 104, the central server 102, and/or the external server 106 may communicate via USB, Bluetooth, Wi-Fi Direct, Near Field Communication (NFC), a private or public network (e.g., via an Internet protocol, such as IPv4, via a virtual private network (VPN)), etc. For example, the central server 102 may transmit a data object indicating one or more outcomes, a predicted timeline, an event/state sequence, a timing feature, a cluster and/or cluster data, standardized data, a generated embedding, and/or any other values, responses, or combinations thereof to the computing device 104 via the networking interface **102*c*, which the computing device 104 may receive via the networking interface 104*c***.

The external server 106 may be or include computing servers and/or combinations of multiple servers storing data that may be accessed/retrieved by the central server 102 and/or the computing device 104. In certain embodiments, the external server 106 receives data from the central server 102 and/or the computing device 104 and retrieves/accesses information stored in memory **106*b* for transmission back to the central server 102 and/or the computing device 104. The external server 106 may include a processor 106*a*, a memory 106*b*, and a networking interface 106*c*. It should be appreciated that the external server 106** can include one or multiple computing devices that are co-located or distributed.

Further, in certain embodiments, the external server 106 includes a data set **106*b*1 including data from one or both of the computing device 104 and/or the central server 102. In one such example, the external server 106 is a server located in and/or otherwise associated with a hospital or other healthcare provider, and the data set 106*b*1 includes electronic health records in memory 106*b*. As another example, the external server 106 serves as a database for some/all of the timeline data 102*b*4. In some embodiments, the example computing system 100 does not include the external server 106**.

Each of the processors **102*a*, 104*a*, 106*a* may include any suitable number of processors and/or processor types. For example, the processors 102*a*, 104*a*, 106*a* may each include one or more CPUs and one or more graphics processing units (GPUs). Generally, each of the processors 102*a*, 104*a*, 106*a* may be configured to execute software instructions stored in each of the corresponding memories 102*b*, 104*b*, 106*b*. The memories 102*b*, 104*b*, 106*b* may each include one or more persistent memories (e.g., a hard drive and/or solid state memory) and may store one or more applications, modules, and/or models, such as the timeline application 102*b*1**.

The networking interface **102*c* may enable the central server 102 to communicate with the computing device 104, the external server 106, and/or any other suitable devices or combinations thereof. More specifically, the networking interface 102*c* may enable the central server 102 to communicate with each component of the example computing system 100 across the network 108 through their respective networking interfaces 104*c*, 106*c*. The networking interfaces 102*c*, 104*c*, 106*c* may support one or more of the communication/network protocols implemented by the network 108. The networking interface 102*c* may enable the central server 102 to communicate with the various components of the example computing system 100** via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc.

Moreover, the network 108 may be a single communication network, or may include multiple communication networks of one or more types (e.g., one or more wired and/or PANs or LANs, and/or one or more WANs such as the Internet). In some embodiments, the network 108 includes multiple, entirely distinct networks (e.g., one or more networks for communications between central server 102 and computing device 104, and a separate, Bluetooth or wireless LAN (WLAN) network for communications between central server 102 and computing device 104, and so on).

It will be understood that the above disclosure is one example and does not necessarily describe every possible embodiment. As such, it will be further understood that alternate embodiments may include fewer, alternate, and/or additional steps or elements.

Example Data Timeline Phenotyping Workflows

Figure 2A:
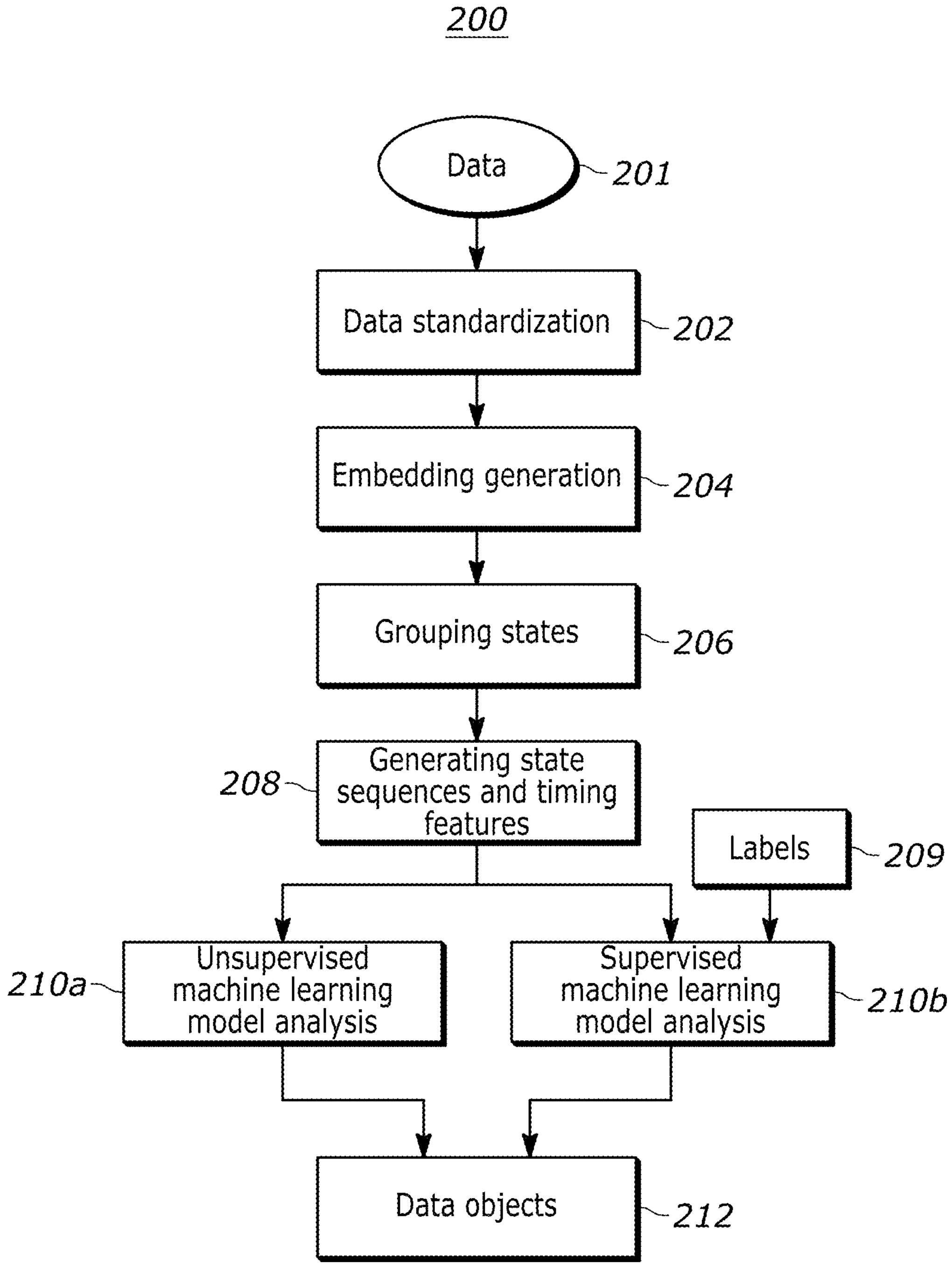
FIG. 2A depicts an example data timeline phenotyping overview workflow, in accordance with various embodiments described herein.

FIG. 2A depicts an example data timeline phenotyping overview workflow 200, in accordance with various embodiments described herein. The example data timeline phenotyping overview workflow 200 broadly illustrates the workflow 200 as a sequence of actions, although the workflow 200 may be executed in series, in parallel, or in any other order, and may be performed by central server 102 (e.g., processor **102*a* and/or other components of central server 102) of FIG. 1, for example, to receive data 201 as input and output data objects 212. The example data timeline phenotyping overview workflow 200 illustrated in FIG. 2A** is for the purposes of discussion only, and additional/alternative rule signature generation and/or categorization determination sequences may additionally or alternatively be utilized.

The data timeline phenotyping overview workflow 200 may include receiving data 201 and standardizing the data included therein (block 202). The workflow 200 may include generating embeddings, by a machine-learned model, for all unique event combinations in the standardized data (block 204) and grouping contextually similar unique event combinations into states (block 206). Grouping the event combinations into states at block 206 reduces the total number of event combinations subsequently analyzed as part of the workflow 200, and consequently improves interpretability of the resulting analysis.

In any event, the workflow 200 may then include determining state sequences that satisfy an occurrence threshold and generating a set of timing features associated with the state sequences (block 208). These state sequences and sets of timing features may be utilized as features to generate clusters/subclusters of the samples which are inputs to at least one type of machine-learned (ML) model (e.g., ML model **102*b*2) (block 210*a*, 210*b*). Block 210*a* may generally correspond to generating these clusters/subclusters using an unsupervised ML model(s), and block 210*b* generally corresponds to generating these clusters/subclusters using a supervised ML model(s). To further inform and/or enable the predictions output by the supervised ML model(s) at block 210*b*, the models may additionally or alternatively receive external labels and/or outcomes (block 209**) of prior timeline predictions.

The workflow 200 may additionally or alternatively include generating data objects indicating one or more outcomes of interest (block 212). The data objects 212 may generally represent metrics (e.g., a predicted likelihood, such as a posterior probability, of an adverse event, a disease progression rate, a treatment response rate) associated with the outcomes of interest for certain timelines, and/or may include prediction results that generally indicate predicted aggregated error representing relationships between predicted timelines and the outcomes of interest. The ML model(s) **210*a* and/or 210*b* may output data that can be included as part of the data objects 212, and the supervised ML model(s) 210*b* may output the prediction results. For example, a data object 212 may include phenotype-wise metrics data, longest shared subsequences of generated clusters/subclusters, and/or sample sizes from either ML model(s) 210*a*, 210*b*, and the prediction results included as part of the data object 212 may include phenotype-wise prediction results output by the supervised ML model(s) 210*b***.

As mentioned, the data objects 212 may generally indicate/represent one or more outcomes of interest for a particular sample. The data objects 212 may include and/or otherwise indicate one or more of metrics associated with the outcomes of interest, prediction results associated with the outcomes of interest, a corresponding predicted timeline indicating the one or more outcomes of interest, and/or any other suitable data or combinations thereof to represent the outcomes of interest. In certain embodiments, the data object 212 includes (i) a longest shared state sequence between the sample and at least one other sample within the cluster including the sample, (ii) metrics corresponding to the cluster, and/or (iii) a sample size associated with the cluster.

Figure 2B:
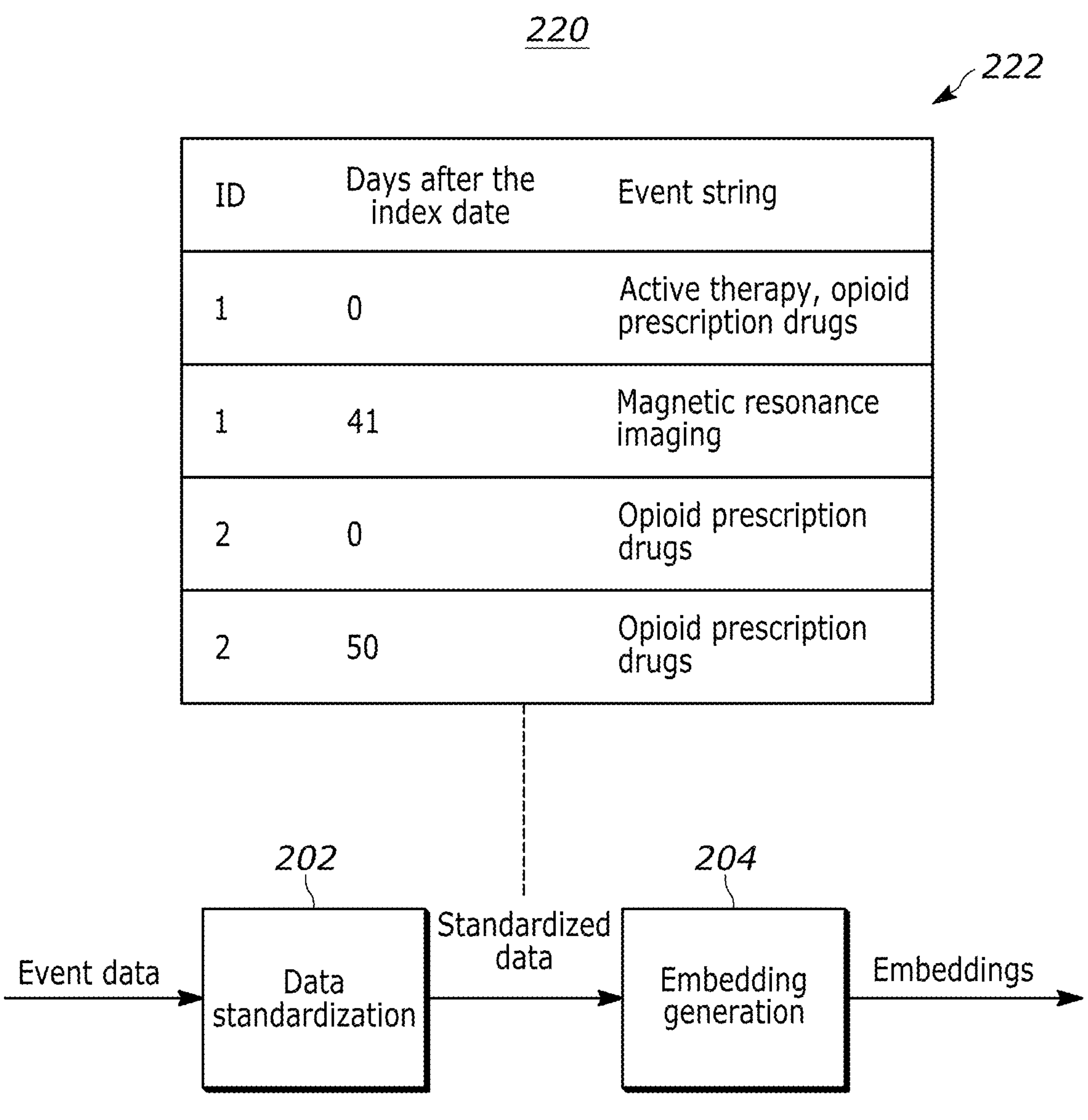
FIG. 2B depicts an example input standardization and embedding workflow, in accordance with various embodiments described herein.

FIG. 2B depicts an example input standardization and embedding workflow 220 that includes blocks 202 and 204 from FIG. 2A, in accordance with various embodiments described herein. The input of the workflow 220 may include event data indicating events associated with one or more users, and the output of the workflow 220 is one or more embeddings associated with unique event combination(s). Any of the actions/steps described with reference to FIG. 2B may be performed by central server 102 (e.g., processor **102*a* and/or other components of central server 102) of FIG. 1**, and/or any other suitable processor or combinations thereof.

Initially, the workflow 220 may include receiving and/or accessing event data and standardizing (block 202) the data. Block 202 may involve a processing system (e.g., central server 102) converting any of the event data not already in a standardized format into a standardized format (e.g., via standardization algorithm **102*b*6**) to streamline subsequent steps. In certain embodiments, the standardized format is a tabular format consisting of three columns: a patient/member identification (ID) value, a timestamp, and one or more events. Thus, for two samples that have event data (e.g., ID value, timestamp data, event data) formatted in accordance with different formats, the standardization described herein may include extracting these values from the both samples and generating a set of standardized samples comprising the extracted data from both samples, wherein the standardized samples within the set are formatted in accordance with a standardized format. The standardized format may be any suitable format, as desired by a user and may include any other (positive) number of dimensions of the standardized format.

For example, a user may indicate a time granularity of all data clustered as part of this workflow 220 to be at a day level, and all data to be standardized at block 202 may have time stamps indicating dates or days before/after an index date. The index date generally aligns the predicted timelines and can be chosen and/or determined depending on the particular use-case of interest. As one example, the index date is the date of first occurrence of a specific diagnosis.

For a standard tabular format, each row may correspond to events combinations a particular user encountered at a given date. In one column of the standard tabular format, generally represented by table 222, each events combination may comprise a text description, and multiple events are separated by a separator (e.g., a comma). For example, the top row of the standardized table 222 illustrated in FIG. 2B includes a text description indicating the events "Active Therapy" and "Opioid Prescription Drugs", which comprise the event combination experienced/encountered by the patient (e.g., having Patient ID "1") during this visit to the physician. This text description indicates that the patient represented by Patient ID "1" experienced/encountered some form of active therapy and an opioid drug prescription during their visit to a physician that occurred "0" days after the index date (e.g., the beginning) of the sequence of event combinations (e.g., the event sequence) corresponding to this particular medical diagnosis or larger phenotype. As there are many types of data in many different industries, and different databases have different designs, block 202 overcomes challenges faced by many conventional systems that are incapable of operating with wide varieties of data and data formats. In certain embodiments, the output of block 202 is a table 222 with a standardized 3-columns format.

The workflow 220 may then continue at block 204, which may comprise generating a set of embeddings by a machine-learned model that uses the set of standardized data as input, where the machine-learned model may generate a first embedding using a first standardized unique events combination of the set of standardized data. In particular, block 204 may include generating embeddings for each unique events combination in the standardized data (e.g., table 222) by transforming the unique events combination data into an n-dimensional embedding space (e.g., n being a positive integer) where similar data points (e.g., events combinations) are positioned closer together, and dissimilar data points are farther apart.

In instances where the standardized data includes multiple events within a same time unit, block 204 may additionally or alternatively include sorting the events at the same time unit. For example, block 204 may include sorting multiple events at a same time unit alphabetically by their first character when the order of events within the same time unit is irrelevant. Once sorted, block 204 may include extracting unique event combinations and inputting the unique event combinations to a trained language model to generate the embeddings. For example, block 204 may include extracting the unique event combinations and inputting the unique event combinations into a machine-learned model, such as an encoder model. For example, the encoder model may comprise a Bidirectional Encoder Representations from Transformers for Biomedical Text Mining (BioBERT) model, which is a biomedical language representation model trained on a large corpus of medical text, to generate the embeddings. Additionally, or alternatively, the encoder model may include one or more of Word2Vec, other BERT models (e.g., sentence BERT (SBERT)), t-distributed stochastic neighbor embedding (t-SNE), and/or the like.

Block 204 may then include outputting these embeddings for use at block 206 and may additionally or alternatively merge the embeddings back with the standardized data (e.g., via concatenation, adding a tabular column indicating the respective embeddings) to create a standardized data set that includes the embeddings. For example, block 204 may include the embeddings into the table 222, such that the data utilized at block 206 includes the original three columns along with additional columns indicating the value of an embedding at a j-th dimension in an n-dimensional embedding, where j and n are positive integers. For example, if the encoder model is trained to generate embeddings having 768 dimensions, 768 columns may be added to the table and a particular row associated with those columns may indicate the value indicated by the embedding at each of the respective dimensions of the embedding generated for the unique events combination associated with the row. Additionally, or alternatively, a single column may be added where a row associated with the column may indicate the entire embedding generated for the unique events combination associated with the row as an array, pointer to an electronic storage location where the embedding is stored, or similar.

Figure 2C:
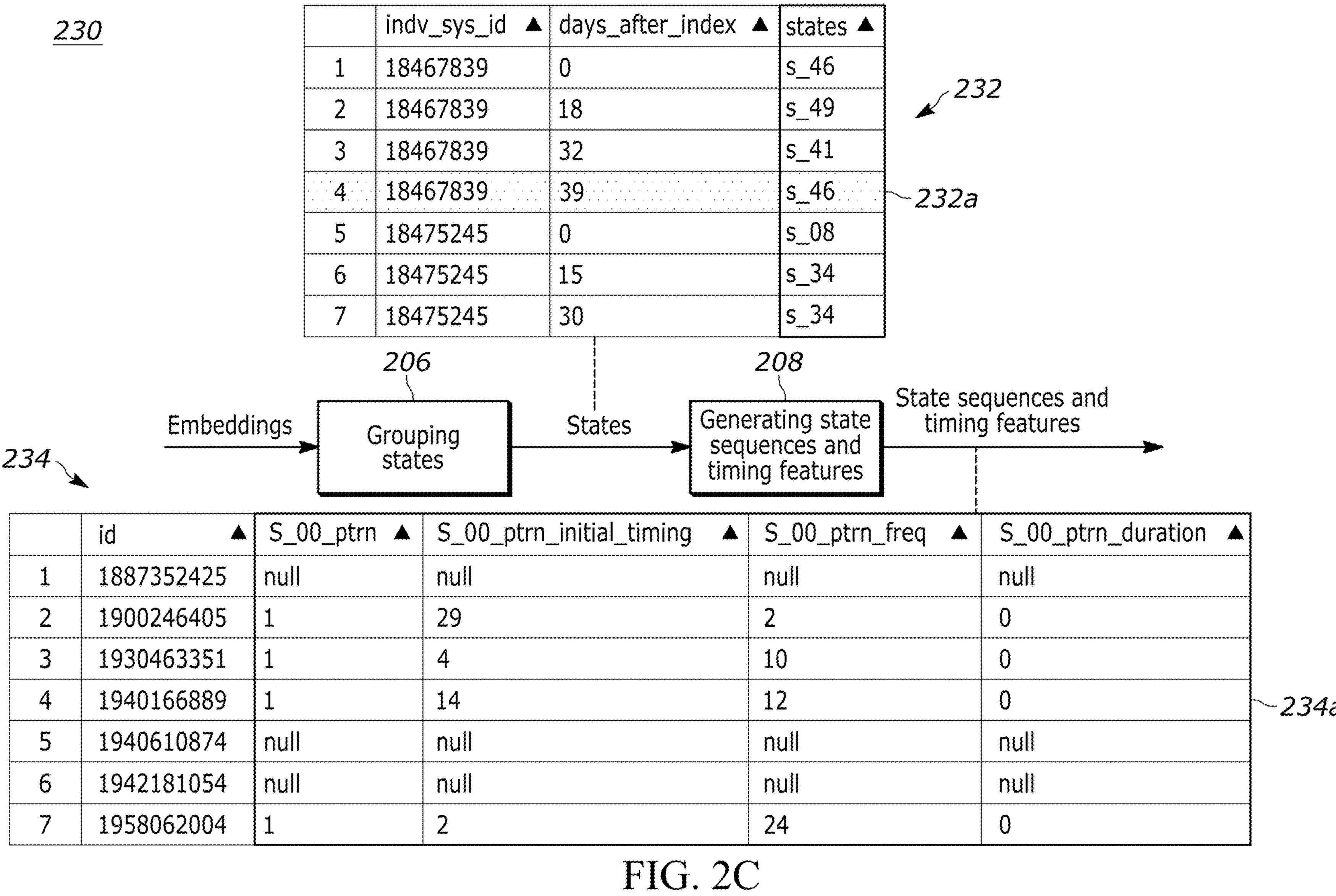
FIG. 2C depicts an example states identification and timing features generation workflow, in accordance with various embodiments described herein.

FIG. 2C depicts an example states identification and timing features generation workflow 230 that includes blocks 206 and 208 from FIG. 2A, in accordance with various embodiments described herein. The input of the workflow 230 is the embeddings generated as a result of the workflow 220, including blocks 202 and 204, and the output of the workflow 230 is one or more state sequences and set of timing features for each state sequence and/or events within the individual state sequences. Any of the actions/steps described with reference to FIG. 2C may be performed by central server 102 (e.g., processor 102*a* and/or other components of central server 102) of FIG. 1, and/or any other suitable processor or combinations thereof.

The workflow 230 begins at block 206, which may comprise utilizing the embeddings to identify one or more states associated with the unique event combinations. More broadly, the objective of the actions performed at block 206 is to group contextually similar unique event combinations into clusters (i.e., states) to reduce the number of event combinations and improve interpretability. Many event combinations are similar but are only observed/present in relatively few instances, such that grouping these uncommon event combinations together improves interpretability and also improves the resulting prediction performance.

Block 206 may additionally or alternatively include applying dimension reduction techniques (e.g., principal component analysis (PCA), kernel PCA, using a machine-learned model such as an autoencoder, t-distributed stochastic neighbor embedding (t-SNE), uniform manifold approximation and projection (UMAP)) to the set of embeddings to reduce the dimension of the respective embeddings. In some examples, the dimension reduction techniques may additionally or alternatively be used to determine one or more features indicated by unique event combinations that had a greatest impact on how an embedding's location in the embedding space was determined, which may be used to increase the interpretability of the results discussed herein. In instances when the embeddings are included in a standardized tabular format, the dimension reduction techniques may reduce a number of columns present in the table, or in an example where the embeddings are indicated as an array, the number of elements in the array may be reduced.

Block 206 may additionally or alternatively include calculating distance(s) (e.g., cosine distance, L1 distance, Euclidean distance, Hamming distance, Chebyshev distance) between the embeddings (or reduced-dimension embeddings) generated for the unique event combinations and clustering unique event combinations based at least in part on the distance(s) and/or the embeddings themselves. For example, clustering the embeddings may comprise a density-based clustering method (e.g., density-based spatial clustering of applications with noise (DBSCAN)), distribution-based clustering (e.g., expectation-maximization model(s)), centroid-based clustering (e.g., k-means, k-medoids), a neural network implementing PCA (e.g., neural PCA), and/or the like.

Block 206 may further include iteratively applying a density-based clustering algorithm to the reduced-dimension embeddings to generate one or more candidate sets of states. Block 206 may additionally or alternatively perform iterative applications of the density-based clustering algorithm utilizing one or more unique hyperparameter combinations. As part of these iterative applications, block 206 may calculate, for the one or more candidate sets of states, (i) a silhouette score indicating a match quality of the reduced dimension embedding to a candidate state and (ii) a quantity of samples with a corresponding event combination failing to satisfy a combination frequency threshold. The combination frequency threshold may generally indicate the frequency at which an event combination (e.g., represented by the reduced-dimension unique combination embeddings) appears within a candidate state or set of states when determining an optimal candidate set of states. Any event combination that fails to satisfy the combination frequency threshold may represent a "rare" event combination that can potentially overfit the resulting states and may more optimally be treated as noise and ignored. Further, block 206 may additionally or alternatively generate the one or more states based on a candidate set of states corresponding to a highest silhouette score and a minimum quantity of samples with a corresponding event combination failing to satisfy the combination frequency threshold.

As one example, block 206 may include applying a density-based clustering algorithm (e.g., DBSCAN) to four reduced-dimension embeddings representing four unique event combinations. In this example, assume that the minimum points to form a dense region is two, the epsilon (E)

distance hyperparameter is a first value during a first iteration of the density-based clustering algorithm and a second value during a second iteration of the algorithm. During the first iteration a first and second reduced-dimension embedding (e.g., A and B) are close to each other in the embedding space (e.g., are within the first value of & from one another), and a third and fourth reduced-dimension embedding (e.g., C and D) are far away from each of the other three embeddings in the embedding space. Thus, as a result of this first iteration, block 206 may form three separate clusters (e.g., candidate states)-one that includes A and B because they are core points within each other's e-neighborhood, and two that include C and D, respectively, because their s-neighborhoods may not include any other embeddings. Block 206 may additionally or alternatively determine a first average silhouette score based on these three clusters.

During the second iteration this example, the second value of & may cause the clustering algorithm to determine that C is close enough to (e.g., is within the distance indicated by the second value of & from) A and B, while D is too far away from A, B, and C to satisfy the second value of &. Assuming that there are no other points nearby D within the distance indicated by the second value of &, embedding D's E-neighborhood may not include any other embeddings, such that A, B, and C qualify as core points (e.g., satisfy the minimum points for a dense region) and D does not. Thus, in this example, block 206 may form a cluster based on A, B, and C because they are core points within each other's-neighborhood, and block 206 may designate D as noise or its own separate cluster. Block 206 may additionally or alternatively determine a second average silhouette score based on these two clusters (a second candidate state set), and this second average silhouette score may be lower than the first average silhouette score, indicating that the first candidate set of states is more optimal than the second candidate set of states.

For example, because embeddings C and D are both in lone clusters (e.g., clusters including one embedding) during the first iteration, the clustering algorithm may determine that these embeddings are noise which may be ignored. The clustering algorithm may thus determine the first average silhouette score based on the fit associated with the candidate state including only embeddings A and B, which are located within the distance indicated by the first value of 8. By contrast, the clustering algorithm may determine the second average silhouette value based on the fit associated with the candidate state including embeddings A, B, and C, which are located within the distance indicated by the second value of E. This second value of & is larger than the first value of &, indicating a potentially lower degree of fit of each embedding included in the candidate state because the embeddings in the candidate state are not as closely spaced in the embedding space. Of course, it should be appreciated that the clustering algorithm (e.g., as part of block 206) may determine the average silhouette score and/or the optimal candidate cluster set(s) based on any suitable hyperparameters/metrics.

Block 206 may further comprise outputting the set of states based on determining the optimal set of candidate states (e.g., with highest average silhouette score, fewest number of clusters with rare event combinations). In certain embodiments, block 206 may output the set of states in the standardized format used for the outputs from blocks 202 and 204. For example, if the standardized format is a tabular format, then the set of states output at block 206 may be a 3-column table 232 that includes patient/member ID values, time stamps, and the states 232*a*. Thus, in this example, the output of block 206 replaces the events column of the standardized data output at block 202 or the embeddings column of the embeddings output at block 204 with the set of states 232*a*.

More generally, the states output by block 206 may replace the events/events combinations evaluated at subsequent blocks (e.g., blocks 208, 210*a*, 210*b*) described herein. Using the states as inputs instead of events and/or event combinations/sequences reduces the amount of data processed at each subsequent block, thereby reducing the amount of processing resources required to perform the subsequent actions.

The workflow 230 then continues at block 208, which may comprise receiving the set of states and generates a set of state sequences and timing features. Generally, the actions performed at block 208 include converting the output of block 206 (e.g., set of states) to a structured analytical format with state sequences and a set of timing features. Each of these outputs of block 208 can be directly used as inputs to one or more ML models (e.g., ML model 102*b*2), as described in reference to FIG. 2D. In certain embodiments, the structure analytical format is or includes a table, such as table 234 or graph with a set of patient/member ID values, and state sequence values and timing features 234*a* associated therewith.

More specifically, block 208 may additionally or alternatively include a first sub-step of evaluating the states (e.g., set of states 232*a*) output at block 206 for one or more individuals to create state sequence(s) for each individual (i.e., patient/member) represented by the states and determine one or more common/shared state sequences among the individuals. Block 208 may include applying a pattern mining method (e.g., as part of the feature generation algorithm 102*b*3) to the set of states 232*a* to determine whether a state sequence satisfies an occurrence threshold, e.g., that enough other individuals have the state sequence.

In some embodiments, block 208 may include applying the pattern mining method to a set of states to determine whether one or more state sequences from the set of states satisfies the occurrence threshold and determining that a state sequence satisfies the occurrence threshold based on the state sequence occurring within one or more other sets of states corresponding to one or more other samples (e.g., associated with one or more individuals).

For example, block 208 may utilize the Prefix-projected sequential pattern mining (PrefixSpan) method to identify the most frequent state sequences, as PrefixSpan supports mining multiple data types in a sequence (e.g., diagnosis, procedure, medications etc.) and has a scalable implementation. The output of this sub-step of block 208 comprises a list of frequently observed state sequences. For example, a state sequence frequently observed in a states dataset may represent the event sequence "(1) low-back pain diagnosis, (2) opioid prescription, (3) chiropractic therapy, (4) chiropractic therapy, (5) opioid prescription", which includes the event types "diagnosis", "procedure", and "medications", respectively, although additional or alternate event types could be determined.

A second sub-step of block 208 includes generating one or more timing features for the state sequences that satisfy the occurrence threshold based on timing data (e.g., timestamps) included as part of the event combinations for each state of the state sequences that satisfy the occurrence threshold. These timing features may include, e.g., (i) an initial appearance value, (ii) a frequency value, and/or (iii) an average duration value. The initial appearance value may indicate when a first state of a particular state sequence appears within the set of states corresponding to a particular individual and/or when the first state appears on average across all and/or a sub-set of individuals. The frequency value may correspond to how frequently the particular state sequence appears within the set of states for one or more individuals that have the particular state sequence, and the average duration value may indicate how long the particular state sequence lasts (on average) for each individual of the one or more individuals.

Block 208 may further include generating a data structure that includes the state sequences and the timing features, and may further include adjusting the data structure to achieve a sorted and/or otherwise structured data set. For example, when the data structure is the table 234, block 208 includes adjusting the table 234 by pivoting the table 234 by patient/member ID to yield a structured analytical table with the state sequence values and timing features 234*a*, where each row of the table 234 indicates the state sequences and timing features associated with an individual. In particular, a first row of the table 234 corresponding to a first individual (e.g., associated with ID "1887352425") may not have a first frequent state sequence ("S_00"), such that the column indicating the presence/absence of the "S_00" state sequence includes "null" indicating the absence of the state sequence from the first individual's set of states.

Consequently, the columns indicating the timing features for the "S_00" state sequence also include "null" for the first individual. A second row of the table 234 corresponding to a second individual (e.g., associated with ID "1900246205") may have the first frequent state sequence ("S_00"), such that the column indicating the presence/absence of the "S_00" state sequence includes "1" indicating the presence of the state sequence in the second individual's set of states. The columns indicating the timing features for the "S_00" state sequence include "29" (e.g., 29 days) for the initial appearance value, "2" (e.g., occurs twice within the set of states) for the frequency value, and "0" (e.g., within a single physician visit) for the average duration value.

As another example, if an individual has the hypothetical state sequence pattern mentioned above that represents the events "(1) low-back pain diagnosis, (2) opioid prescription, (3) chiropractic therapy, (4) chiropractic therapy, (5) opioid prescription", then the binary feature corresponding to this pattern has a value equal to 1 (otherwise 0). The timing features associated with this subsequence pattern, such as initial appearance timing of low-back pain diagnosis, the frequency and the average duration of the 5-events sequence pattern, etc. can also be determined for this individual and stored as part of the table 234.

Using these sequence pattern mining features discussed herein as part of block 208, the techniques of the present disclosure result in an improvement over conventional techniques. Namely, the actions performed as part of block 208 detect frequent state sequence patterns in AI/ML models, which conventional techniques were unable to accomplish. As a result, this approach described as part of block 208 generally outperforms manual feature engineering and is more interpretable than conventional deep learning-based approaches.

Figure 2D:
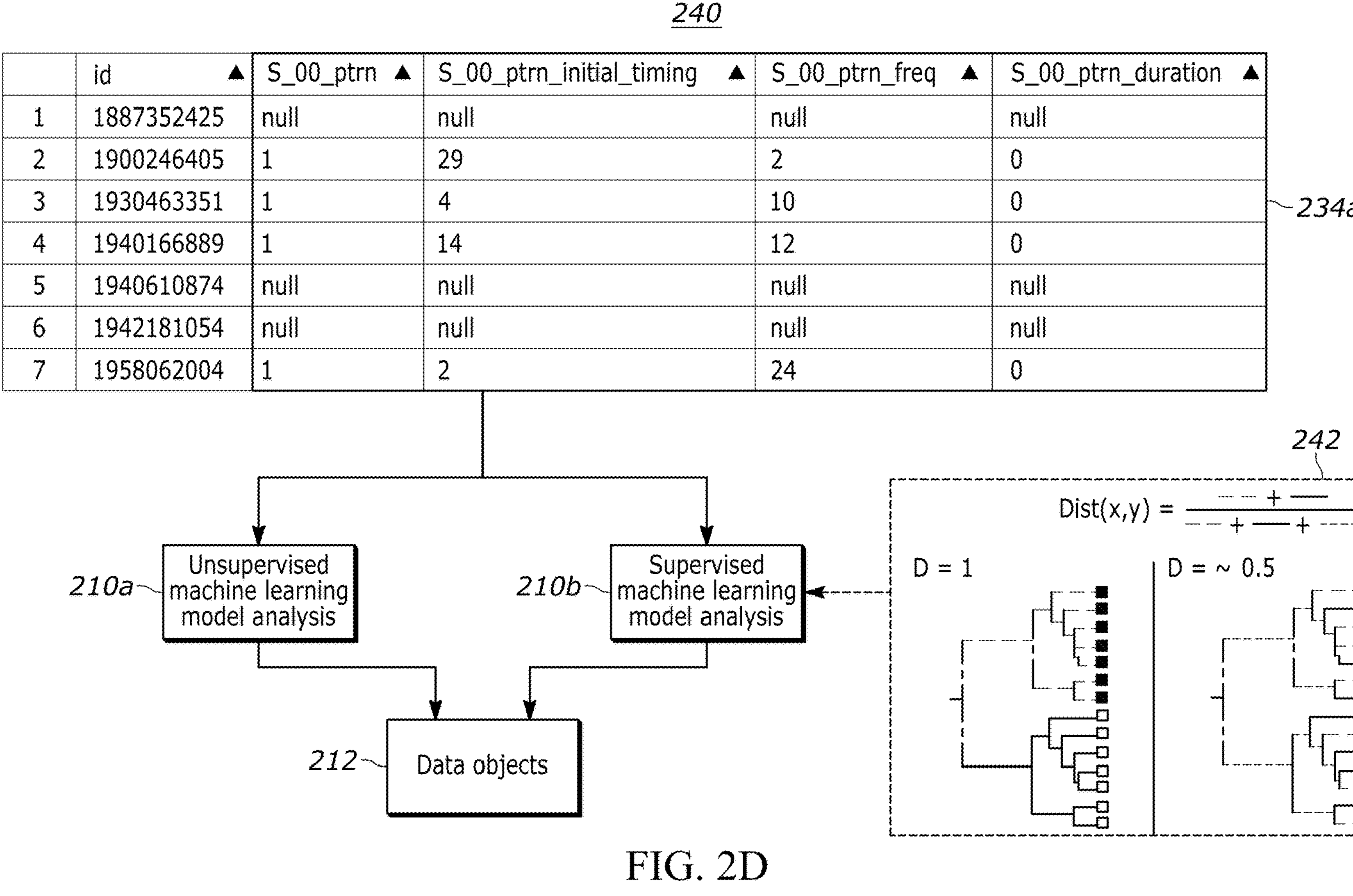
FIG. 2D depicts an example timeline phenotyping prediction workflow, in accordance with various embodiments described herein.

FIG. 2D depicts an example timeline phenotyping prediction workflow 240 that includes blocks 210*a*, 210*b*, and 212 from FIG. 2A, in accordance with various embodiments described herein. The input of the workflow 240 is the state sequence values and timing features 234*a* generated as a result of the workflow 230, including blocks 206 and 208, and the output of the workflow 240 is the data objects 212. In the example of FIG. 2D, the state sequence values and timing features 234*a* generally represent one or more features which the ML models of blocks 210*a*, 210*b* may utilize to cluster/subcluster samples (e.g., patients, claims, etc.) and output the data objects 212 based on these clusters/subclusters. Any of the actions/steps described with reference to FIG. 2D may be performed by central server 102 (e.g., processor 102*a* and/or other components of central server 102) of FIG. 1, and/or any other suitable processor or combinations thereof.

The workflow 240 begins at blocks 210*a* and 210*b*, which may involve inputting the state sequence values and timing features 234*a* into the unsupervised and/or supervised ML models represented by blocks 210*a* and 210*b*, respectively. Machine learning may be implemented through machine learning methods and algorithms. In certain embodiments, the ML model(s) utilized as part of block 210*a* may be or include an unsupervised decision tree configured/trained to stratify the population of interest based on the state sequence values and timing features 234*a*.

More specifically, block 210*a* may include applying an unsupervised ML model to the state sequence values and timing features 234*a* to determine groups of entities with similar timelines without access to ground truth data. More specifically, block 210*a* may include using the state sequence values and timing features 234*a* to cluster samples/entities with similar state sequences into clusters, as determined by the unsupervised ML model. Block 210*a* may further includes characterizing each cluster of samples based on the timing features corresponding to the similar state sequences and determining metrics to define the relevant timeline phenotypes.

A first sub-step of block 210*a* may include subsequences stratification. Generally, this first sub-step may include utilizing the presence/absence of frequent state sequences within samples of the input data (i.e., 234*a*) to segment the population without considering the timing features of those state sequences. Block 210*a* may comprise generating an unsupervised decision tree based at least in part on state sequence values and timing features to stratify the population of interest. At each node (i.e., sub-population) of the input data (234*a*), the unsupervised decision tree may determine the longest and most frequent state sequence to further split/divide the sub-population, such as by determining a presence/absence of the state sequence in the samples of the sub-population, and assigning a classification label to the resultant split node.

For example, suppose the longest and most frequent subsequence observed in a sub-population is the sub-sequence previously described in reference to FIG. 2C (e.g., "(1) low-back pain diagnosis, (2) opioid prescription, (3) chiropractic therapy, (4) chiropractic therapy, (5) opioid prescription"). The unsupervised decision tree may, in some examples, be a binary decision tree that determines whether this state sequence is present or absent in any of the other samples (i.e., 1=pattern is present, 0=pattern is absent) to split the subpopulation into two smaller subpopulations wherein the child nodes generated from the split may be associated with respective probabilities that the samples include a state sequence that matches the state sequences of the parent (i.e., the state sequence is present or absent). Any subsequent child nodes of one of those child nodes may indicate whether a portion of the state sequence or a different state sequence is present in the samples containing the state sequence.

The unsupervised decision tree may implement this recursive partitioning approach to repeatedly split nodes until a smallest state sequence size is reached, thereby creating two or more child nodes and may ultimately be used to generate clusters of samples/entities with identical state sequences, even if they contain variations in their overall event sequences. In certain embodiments, the unsupervised decision tree may additionally or alternatively utilize thresholds of leaf node size (e.g., the smallest state sequence length associated with the leaf nodes at which no further node splitting will be conducted) and/or state sequence frequency (e.g., a threshold probability/percentage/frequency at which no additional splitting will be conducted, such as when the probability/percentage/frequency of a state sequence appearing in other event sequences of at least one of the resultant nodes does not meet or exceed the threshold probability/percentage/frequency) to reach a desired level of granularity in the resulting data.

A second sub-step of block 210_a_ includes further stratifying the clusters output by the unsupervised decision tree into subclusters by applying a clustering algorithm to the clusters and the timing features of the longest and most frequent state sequences used to generate the respective clusters. Within a leaf node of the tree determined in the first sub-step, block 210_a_ includes applying to the subset of state sequences associated with the leaf node a density-based clustering method (e.g., DBSCAN) on the timing features of some/all of the state sequences used as splitting features in the decision tree to reach the leaf node.

Block 210_a_ may additionally or alternatively include iteratively applying the clustering algorithm to the clusters and using different combinations of hyperparameters during each application to determine a set of subclusters that have an optimal match quality (e.g., of samples to their subclusters), as indicated by a silhouette score and/or any other suitable metric(s). This second sub-step may additionally or alternatively include applying size thresholds to the subclusters to ensure that no further stratification is performed if any sub-cluster of a leaf node has a sample size smaller than the size threshold(s). Ultimately, the second sub-step of block 210_a_ includes identifying all subclusters as well as clusters output by the decision tree that cannot further split as the timeline phenotypes of the population of interest, which may be included as part of the data objects 212.

Using the outputs from the second sub-step, block 210_a_ further includes a third sub-step of characterizing/interpreting the clusters/subclusters. In some examples, classifying the clusters/subclusters may comprise generating a text description to characterize up to each cluster. In some examples, this classifying may comprise generating five characterizations of the clusters/subclusters: (i) decision path(s), (ii) discriminative feature(s), (iii) longest shared subsequence(s), (iv) metric(s) associated with the cluster, and (v) sample size(s), although more or less characterizations are contemplated and five characterizations are given for the sake of example. In some examples, the decision paths may uniquely define what subsequences of events/states a cluster/subcluster has or does not have for each leaf node, as identified in the first sub-step of block 210_a_. The discriminative features for the clusters/subclusters generated in the second sub-step of block 210_a_ represent normalized cluster/subcluster averages for up to each feature used in clustering. Further, the discriminative features may include the top-k features with the largest variances of the mean of these clusters/subclusters. The longest shared state sequences identify, for each cluster/subcluster, the longest state sequence(s) shared among a certain percentage of entities within a cluster/subcluster to distinguish clusters/subclusters by event/state sequences. The metrics associated with a cluster may include any variables of interest to calculate metrics for each cluster/subcluster, including but not limited to future cost, utilizations, demographics, state(s), state sequence(s), outcomes, and/or the like in the particular cluster. The sample sizes generally correspond to a number of entities of each cluster/subcluster. Generally speaking, some/all of these five primary characterizations may be included as part of the data objects 212.

As described herein, these features of block 210_a_ (e.g., first, second, and third sub-steps) improve upon conventional techniques. A decision tree stratifying a population based on frequently observed long state sequences is a fast and scalable way to segment a population while improving interpretability of the stratification results. Conventional techniques were unable to achieve these advantages, such that the implementation described above in reference to FIG. 2D improves upon such conventional techniques.

Block 210_b_ may include applying a supervised ML model to the state sequence values and timing features 234_a_, such that the general objective of block 210_b_ is to identify samples/entities that are homogeneous with respect to both timing features and outcomes. In some embodiments, the ML model(s) utilized as part of block 210_b_ is or includes a gradient boosting machine (GBM) that generates outcomes of interest and determines a GBM distance metric to stratify the population of interest using the state sequences values and timing features 234_a_. The GBM may generally utilize the state sequence values and timing features 234_a_ as inputs to generate an outcome of interest for the samples associated with the input values based on the GBM tree leaf nodes into which the samples are stored. Block 210_b_ may further include stratifying each outcome of interest (e.g., associated with individual leaf nodes) based on the likelihood values into one or more bins (clusters), and/or applying a clustering algorithm (e.g., a density-based clustering algorithm) to the bins or the outcomes of interest to generate subclusters of the bins/outcomes. The clustering algorithm may utilize the GBM distance metric for pairs of samples in each bin/outcome to perform the clustering and may be iteratively applied using various combinations of hyperparameters to determine an optimal match quality of samples to their subclusters based on, for example, silhouette scores.

Block 210_b_ may include a first sub-step that includes model training. This first sub-step may include training a gradient boosting machine (GBM) on the state sequence values and timing features 234_a_ and external labels (e.g., external labels 209). These external labels may be associated with historical outcomes of interest (e.g., outcomes of prior event sequences), and the GBM may be trained to output outcomes of interest.

In some examples, training the GBM may comprise altering (e.g., adding, removing, modifying) one or more hyperparameters of the GBM (e.g., number of trees, tree depth, minimum number of samples to split a tree node, number of features at a split, minimum number of samples in a leaf node of a tree, subsample ratio, learning rate, number of training iterations) according to a gradient boosting algorithm that determines a gradient of a loss (e.g., L1, L2, Huber, Cauchy) determined between a predicted output determined by a preliminary version of the GBM (having preliminary hyperparameters) using input training data and a ground truth label associated with the input training data. This may be repeated for one or more sets of input training data and ground truth labels until a stopping condition is reached (e.g., a threshold iteration count, a threshold loss, a threshold average loss, a threshold gradient).

A second sub-step of block 210_b_ may include calculating a GBM distance for pairwise set of samples. The GBM distance metric may generally indicate the path difference between any two samples based on their respective paths through the GBM's trees, as visually represented by the distance illustration 242. Determining the GBM distance between two samples (e.g., patients, claims, etc.) having two different sets of state sequences and timing features may comprise determining a fraction of tree branches associated with the two samples that are unique (i.e., unshared branches between the two samples) among all tree branches in the GBM's trees. For example, two samples sharing a same leaf node in a first tree would indicate a shared (non-unique) branch for that first tree and a GBM distance for the first tree of 0. Whereas if the two samples decision path split at the root node of a second tree (which would be one example of a unique branch), the GBM distance for the second tree would be 1. Any divergence of a decision path for a first sample compared to a second sample would be considered unique for a particular tree.

For example, suppose there are 100 trees in GBM, and for each tree, two samples belong to two different leaf nodes. Determining the GBM distance may comprise determining the fraction of unique branches (or unique branch lengths where the unique branch lengths are the number of nodes subsequent to the node where the feature paths diverged) across all the GBM's trees to the total number (or total length) of all the branches in the GBM's trees. This fraction may be computed by averaging the GBM distance determined for each tree according to the technique discussed above.

In some examples, the time and/or processing load to determine the GBM distance may be reduced by storing a data structure indicating the terminal nodes of all the trees and the features associated therewith and precomputing and storing in the data structure the pairwise distances among all the leaves of a boosted tree. In an example that uses this precomputation, at inference, the process may query this data structure to determine the GBM distance for any two samples.

A third sub-step of block 210*b* includes stratifying up to each outcome of interest based on likelihood values output by the GBM (e.g., associated with individual leaf nodes of the GBM's trees). In some examples, this outcome stratification is performed before determining the pairwise GBM distance(s), which greatly reduces computational cost and improves interpretability of the output results of the GBM. Generally, stratifying the outcomes of interest may include determining one or more bins that are associated with different probability ranges for a given outcome, and clustering the samples into these bins (clusters) based on their corresponding likelihoods for the given outcome. For example, stratifying a certain disease risk may result in 20 bins that include likelihood values ranging from 0-0.05, 0.051-1, . . . , and 0.951-1. Block 210*b* may include determining the bin ranges based on a predetermined range (e.g., predefined in memory or otherwise input by a user).

However, certain outcomes may not have evenly or otherwise normally (e.g., Gaussian) distributed likelihood values, such that specifying an evenly spaced grid for the outcome may result in overfitting and/or otherwise skewing the resulting clusters. In these instances, block 210*b* may include determining the corresponding bin ranges for such an outcome based on the local minimum/a (for a given minimum granularity/bin size) of the distribution of the outcome. For example, a first outcome may have a non-standard distribution of likelihoods with local minima located at 0.3 and 0.9, and block 210 b may thereby include determining three bins for this outcome interest that range from 0-0.3, 0.31-0.9, and 0.91-1. Block 210*b* may further include identifying bins between two local minima as clusters.

The fourth sub-step of block 210*b* may include applying a clustering algorithm to the clusters (bins) and the GBM distance values associated with pairs of samples included in the clusters. The clustering algorithm may be a density-based clustering method (e.g., DBSCAN) and may generate subclusters of samples based on their respective GBM distance values relative to the other samples included in the cluster. The fourth sub-step of block 210*b* may include iteratively applying the clustering algorithm to the clusters and using different combinations of hyperparameters during each application to determine a set of subclusters that have an optimal match quality (e.g., of samples to their subclusters), as indicated by a silhouette score and/or any other suitable metric(s). As a result, the subclusters may represent the timeline phenotypes of the population of interest, and may be indicated/included as part of the data objects 212.

Similar to block 210*a*, block 210*b* may further include a fifth sub-step of characterizing/interpreting the subclusters. In some examples, classifying the subclusters may comprise generating a text description to characterize up to each subcluster. In some examples, this classifying may include generating five characterizations of the subclusters: (i) prediction metrics, (ii) metrics of important features, (iii) longest shared subsequences, (iv) summary metrics, and (v) sample sizes, although more or less characterizations are contemplated and five characterizations are given for the sake of example. The prediction metrics may represent an aggregated prediction error (e.g., mean squared error, false positive rate etc.) to determine which clusters/subclusters are highly associated with outcomes of interest. The metrics of important features may represent the statistics for important variables identified by the GBM to distinguish clusters/subclusters by their most predictive features. The longest shared state sequences may identify the longest state sequence shared among a certain percentage of samples within a cluster/subcluster to distinguish clusters/subclusters by event/state sequences. The summary metrics may include any variables of interest for each cluster/subcluster, including but not limited to future cost, utilizations, demographics, and/or states, state sequences, outcomes, and/or the like in the particular cluster/subcluster. The sample sizes generally correspond to a number of samples of each cluster/subcluster. Generally speaking, some/all of these five primary characterizations may be included as part of the data objects 212.

As described herein, these features of block 210*b* (e.g., first, second, third, fourth, and/or fifth sub-steps) improve upon conventional techniques by, e.g., leveraging the GBM distance metric described in reference to the second sub-step to enable greater visibility and interpretability of the corresponding results output by the GBM than conventional techniques were able to achieve. The GBM distance metric is based in the Unifrac distance and enables the systems described herein to generate insights into operations of the GBM. At least these features of using Unifrac or similar tree-based distance metrics (e.g., GBM distance metric) on tree-based predictive models are not present in conventional systems, such that these conventional systems fail to reap the benefits of such an interpretable distance metric.

In certain embodiments, one or more of the ML models described herein (e.g., ML model 102*b*2) may be trained using supervised and/or unsupervised learning and/or may additionally or alternatively comprise cluster analysis, k-nearest neighbor algorithms, and/or other ML programs/algorithms either individually or in combination.

It is to be understood that supervised ML and/or unsupervised ML may additionally or alternatively comprise retraining, relearning, or otherwise updating models with new or different data, which may include data received, generated, or otherwise used over time. Additionally, or alternatively, clusters may be updated based at least in part on new data or alterations to the data. Further, it should be appreciated that, as previously mentioned, the ML model described herein may be used to output clusters of samples based on state sequences and/or timing features, subclusters of the samples based on the state sequences and/or timing features, data objects, and/or any other values, responses, or combinations thereof using artificial intelligence (e.g., one or more ML models of the ML model **102*b*2**) or, in alternative aspects, without using artificial intelligence.

Example Computer-Implemented Methods

Figure 3:
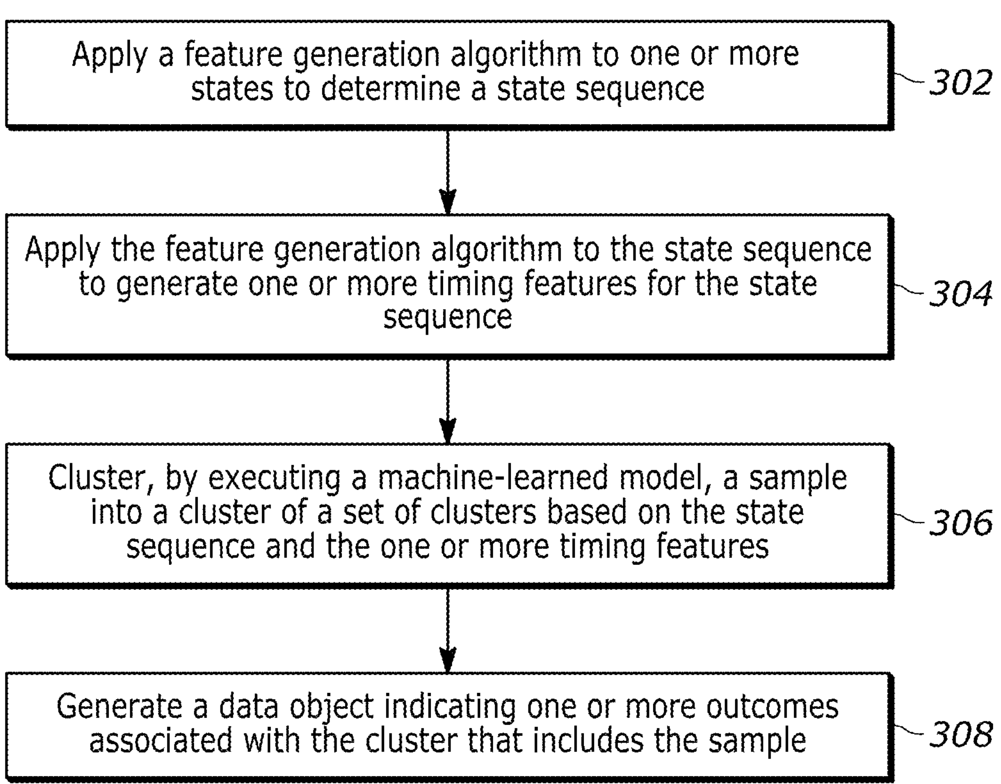
FIG. 3 depicts a flow diagram representing an example computer-implemented method, in accordance with various embodiments described herein.

FIG. 3 depicts a flow diagram representing an example computer-implemented method 300, in accordance with various embodiments described herein. The method 300 may be implemented by one or more processors of the example computing system 100, such as the processor 102 a of central server 102 (e.g., by timeline application **102*b*1**), for example.

The method 300 may include applying a feature generation algorithm to one or more states that represent event combinations associated with one or more samples to determine a state sequence associated with a sample of the one or more samples that satisfies an occurrence threshold (block 302). The state sequence may generally include a state from the one or more states. The method 300 may further include applying the feature generation algorithm to the state sequence to generate one or more timing features for the state sequence (block 304).

The method 300 may further include clustering, by executing a machine-learned model, the sample associated with the state sequence into a cluster of a set of clusters based on the state sequence and the one or more timing features (block 306). The method 300 may further include generating, for the sample, a data object indicating one or more outcomes associated with the cluster that includes the sample (block 308).

In certain embodiments, the machine-learned model may be an unsupervised decision tree model, the state sequence is included within a set of state sequences determined by the feature generation algorithm as satisfying the occurrence threshold, and clustering the sample further includes iteratively determining, by one or more processors, whether the sample includes one or more state sequences that (i) include a larger number of states than at least one other state sequence included in the set of state sequences and (ii) occur more frequently within the set of states than at least one other state sequence included in the set of state sequences; determining, by the one or more processors, that: a node of the unsupervised decision tree model comprising the sample satisfies a size threshold, or an occurrence frequency, within the set of states, of remaining state sequences in the set of state sequences included in at least one sample within the node that have not been evaluated as part of the iterative determining fails to satisfy a sequence frequency threshold; and clustering, by the one or more processors and based on the determining, the sample into the cluster of the set of clusters that corresponds with the node.

In certain embodiments, the method 300 may further include iteratively applying, by one or more processors, a density-based clustering algorithm to (i) samples comprising the node and (ii) timing features of the one or more state sequences evaluated as part of the iterative determining to generate one or more sets of subclusters, wherein iterative applications of the density-based clustering algorithm utilize one or more unique hyperparameter combinations; determining, by the one or more processors for the one or more sets of subclusters, a silhouette score indicating a match quality of the sample to one or more subclusters; and clustering, by the one or more processors, the sample into a subcluster of the one or more subclusters based on a set of subclusters corresponding to a highest silhouette score.

In certain embodiments, the machine-learned model may be a gradient boosting machine (GBM) model, the state sequence is included within a set of state sequences determined by the feature generation algorithm as satisfying the occurrence threshold, the one or more timing features are included within a set of timing features generated by the feature generation algorithm, and clustering the sample further includes training, by one or more processors, the GBM using (i) the set of state sequences, (ii) the set of timing features, and (iii) one or more labels associated with historical outcomes, wherein the GBM is trained to output an outcome of interest likelihood for the sample; and stratifying, by the one or more processors based on the outcome of interest likelihood, the sample into a bin of a set of bins associated with outcome of interest likelihoods, the bin corresponding with the cluster of the set of clusters, wherein boundaries of the set of bins are based on: a predetermined range of outcome of interest likelihood values, or one or more local minima of a distribution of the outcome of interest likelihood values.

In certain embodiments, the GBM may comprise one or more decision trees, the one or more samples may have associated decision paths along the one or more decision trees, and the method 300 may further include determining, by one or more processors, a listing of terminal nodes for the one or more decision trees; determining, by the one or more processors, a set of pairwise distances between the terminal nodes, wherein a pairwise distance of the set of pairwise distances represents a fraction of decision paths along a decision tree of the one or more decision trees not shared by a first decision path leading to a first terminal node and a second decision path leading to a second terminal node; and storing, by the one or more processors, the listing of terminal nodes and the set of pairwise distances in a storage location.

In certain embodiments, the method 300 may further include querying, by one or more processors, the storage location to determine pairwise distances between the sample and one or more other samples included in the bin of the one or more bins; iteratively applying, by the one or more processors, a density-based clustering algorithm to (i) samples included in the bin of the one or more bins and (ii) the pairwise distances to generate one or more sets of subclusters, wherein iterative applications of the density-based clustering algorithm utilize one or more unique hyperparameter combinations; determining, by the one or more processors for the one or more sets of subclusters, a silhouette score indicating a match quality of the sample to one or more subclusters; and clustering, by the one or more processors, the sample into a subcluster of the one or more subclusters based on a set of subclusters corresponding to a highest silhouette score.

In certain embodiments, the feature generation algorithm may comprise a pattern mining method, and applying the feature generation algorithm may further include applying, by one or more processors, the pattern mining method to a set of states of the one or more states to determine whether one or more state sequences from the set of states satisfies the occurrence threshold, the set of states corresponding to the sample; determining, by the one or more processors, that the state sequence satisfies the occurrence threshold based on the state sequence occurring within one or more other sets of states corresponding to one or more other samples of the one or more samples; and generating, by the one or more processors, the one or more timing features associated with the state sequence based on timestamp data of event combinations associated with the state sequence.

In certain embodiments, the one or more timing features may include at least one of: (i) an initial appearance value, (ii) a frequency value, or (iii) an average duration value.

In certain embodiments, the event combinations associated with the one or more samples may comprise one or more events, and the method 300 may further include determining, by one or more processors based on the event combinations, a unique event combination of the one or more events; generating, by the one or more processors executing an encoder, an embedding for the unique event combination; applying, by the one or more processors, a dimension reduction algorithm to the embedding to generate a reduced dimension embedding representing the unique event combination; and applying, by the one or more processors, a density-based clustering algorithm to the reduced-dimension embedding and one or more other reduced dimension embeddings representing other unique event combinations to generate the one or more states.

In certain embodiments, the method 300 may further include determining, by one or more processors, a cosine distance of the reduced-dimension embedding from the one or more other reduced-dimension embeddings; iteratively applying, by the one or more processors, the density-based clustering algorithm to (i) the reduced-dimension embedding and (ii) the one or more other reduced-dimension embeddings to generate one or more candidate sets of states, wherein iterative applications of the density-based clustering algorithm utilize one or more unique hyperparameter combinations; determining, by the one or more processors for the one or more candidate sets of states, (i) a silhouette score indicating a match quality of the reduced dimension embedding to a candidate state and (ii) a quantity of samples with a corresponding event combination failing to satisfy a combination frequency threshold; and generating, by the one or more processors, the one or more states based on a candidate set of states corresponding to a highest silhouette score and a minimum quantity of samples with a corresponding event combination failing to satisfy the combination frequency threshold.

In certain embodiments, the method 300 may further include receiving, at one or more processors, sample data comprising a first sample formatted in accordance with a first format and a second sample formatted in accordance with a second format that is different from the first format; extracting, by the one or more processors executing a standardization algorithm, (i) an identification number, (ii) timestamp data, or (iii) event data from the first sample and the second sample; generating, by the one or more processors, a set of standardized samples comprising the extracted data from the first sample and the second sample, the set of standardized samples being formatted in accordance with a standardized format; and determining, by the one or more processors, the event combinations based on the set of standardized samples.

In certain embodiments, the machine-learned model may include an unsupervised decision tree model and a trained GBM.

In certain embodiments, the data object may include (i) a longest shared state sequence between the sample and at least one other sample within the cluster, (ii) metrics corresponding to the cluster, or (iii) a sample size associated with the cluster.

Of course, it is to be appreciated that the actions of the method 300 may be performed any suitable number of times, and that the actions described in reference to the method 300 may be performed in any suitable order.

EXAMPLES

Example 1

A computer-implemented method comprising: applying, by one or more processors, a feature generation algorithm to one or more states that represent event combinations associated with one or more samples, wherein applying the feature generation algorithm includes: determining a state sequence associated with a sample of the one or more samples that satisfies an occurrence threshold, the state sequence including a state from the one or more states, and generating one or more timing features for the state sequence; clustering, by the one or more processors executing a machine-learned model, the sample associated with the state sequence into a cluster of a set of clusters based on the state sequence and the one or more timing features; and generating, by the one or more processors for the sample, a data object indicating one or more outcomes associated with the cluster that includes the sample.

Example 2

The computer-implemented method of example 1, wherein the machine-learned model is an unsupervised decision tree model, wherein the state sequence is included within a set of state sequences determined by the feature generation algorithm as satisfying the occurrence threshold, and wherein clustering the sample further comprises: iteratively determining, by the one or more processors, whether the sample includes one or more state sequences that (i) include a larger number of states than at least one other state sequence included in the set of state sequences and (ii) occur more frequently within the set of states than at least one other state sequence included in the set of state sequences; determining, by the one or more processors, that: a node of the unsupervised decision tree model comprising the sample satisfies a size threshold, or an occurrence frequency, within the set of states, of remaining state sequences in the set of state sequences included in at least one sample within the node that have not been evaluated as part of the iterative determining fails to satisfy a sequence frequency threshold; and clustering, by the one or more processors and based on the determining, the sample into the cluster of the set of clusters that corresponds with the node.

Example 3

The computer-implemented method of example 2, further comprising: iteratively applying, by the one or more processors, a density-based clustering algorithm to (i) samples comprising the node and (ii) timing features of the one or more state sequences evaluated as part of the iterative determining to generate one or more sets of subclusters, wherein iterative applications of the density-based clustering algorithm utilize one or more unique hyperparameter combinations; determining, by the one or more processors for the one or more sets of subclusters, a silhouette score indicating a match quality of the sample to one or more subclusters; and clustering, by the one or more processors, the sample into a subcluster of the one or more subclusters based on a set of subclusters corresponding to a highest silhouette score.

Example 4

The computer-implemented method of any of examples 1-3, wherein the machine-learned model is a gradient boosting machine (GBM) model, wherein the state sequence is included within a set of state sequences determined by the feature generation algorithm as satisfying the occurrence threshold, wherein the one or more timing features are included within a set of timing features generated by the feature generation algorithm, and wherein clustering the sample further comprises: training, by the one or more processors, the GBM using (i) the set of state sequences, (ii) the set of timing features, and (iii) one or more labels associated with historical outcomes, wherein the GBM is trained to output an outcome of interest likelihood for the sample; and stratifying, by the one or more processors based on the outcome of interest likelihood, the sample into a bin of a set of bins associated with outcome of interest likelihoods, the bin corresponding with the cluster of the set of clusters, wherein boundaries of the set of bins are based on: a predetermined range of outcome of interest likelihood values, or one or more local minima of a distribution of the outcome of interest likelihood values.

Example 5

The computer-implemented method of example 4, wherein the GBM comprises one or more decision trees, wherein the one or more samples have associated decision paths along the one or more decision trees, and wherein the computer-implemented method further comprises: determining, by the one or more processors, a listing of terminal nodes for the one or more decision trees; determining, by the one or more processors, a set of pairwise distances between the terminal nodes, wherein a pairwise distance of the set of pairwise distances represents a fraction of decision paths along a decision tree of the one or more decision trees not shared by a first decision path leading to a first terminal node and a second decision path leading to a second terminal node; and storing, by the one or more processors, the listing of terminal nodes and the set of pairwise distances in a storage location.

Example 6

The computer-implemented method of example 5, further comprising: querying, by the one or more processors, the storage location to determine pairwise distances between the sample and one or more other samples included in the bin of the one or more bins; iteratively applying, by the one or more processors, a density-based clustering algorithm to (i) samples included in the bin of the one or more bins and (ii) the pairwise distances to generate one or more sets of subclusters, wherein iterative applications of the density-based clustering algorithm utilize one or more unique hyperparameter combinations; determining, by the one or more processors for the one or more sets of subclusters, a silhouette score indicating a match quality of the sample to one or more subclusters; and clustering, by the one or more processors, the sample into a subcluster of the one or more subclusters based on a set of subclusters corresponding to a highest silhouette score.

Example 7

The computer-implemented method of any of examples 1-6, wherein the feature generation algorithm comprises a pattern mining method, and wherein applying the feature generation algorithm further comprises: applying, by the one or more processors, the pattern mining method to a set of states of the one or more states to determine whether one or more state sequences from the set of states satisfies the occurrence threshold, the set of states corresponding to the sample; determining, by the one or more processors, that the state sequence satisfies the occurrence threshold based on the state sequence occurring within one or more other sets of states corresponding to one or more other samples of the one or more samples; and generating, by the one or more processors, the one or more timing features associated with the state sequence based on timestamp data of event combinations associated with the state sequence.

Example 8

The computer-implemented method of example 7, wherein the one or more timing features includes at least one of: (i) an initial appearance value, (ii) a frequency value, or (iii) an average duration value.

Example 9

The computer-implemented method of any of examples 1-8, wherein the event combinations associated with the one or more samples comprise one or more events, and wherein the computer-implemented method further comprises: determining, by the one or more processors based on the event combinations, a unique event combination of the one or more events; generating, by the one or more processors executing an encoder, an embedding for the unique event combination; applying, by the one or more processors, a dimension reduction algorithm to the embedding to generate a reduced dimension embedding representing the unique event combination; and applying, by the one or more processors, a density-based clustering algorithm to the reduced-dimension embedding and one or more other reduced dimension embeddings representing other unique event combinations to generate the one or more states.

Example 10

The computer-implemented method of example 9, further comprising: determining, by the one or more processors, a cosine distance of the reduced-dimension embedding from the one or more other reduced-dimension embeddings; iteratively applying, by the one or more processors, the density-based clustering algorithm to (i) the reduced-dimension embedding and (ii) the one or more other reduced-dimension embeddings to generate one or more candidate sets of states, wherein iterative applications of the density-based clustering algorithm utilize one or more unique hyperparameter combinations; determining, by the one or more processors for the one or more candidate sets of states, (i) a silhouette score indicating a match quality of the reduced dimension embedding to a candidate state and (ii) a quantity of samples with a corresponding event combination failing to satisfy a combination frequency threshold; and generating, by the one or more processors, the one or more states based on a candidate set of states corresponding to a highest silhouette score and a minimum quantity of samples with a corresponding event combination failing to satisfy the combination frequency threshold.

Example 11

The computer-implemented method of any of examples 1-10, further comprising: receiving, at the one or more processors, sample data comprising a first sample formatted in accordance with a first format and a second sample formatted in accordance with a second format that is different from the first format; extracting, by the one or more processors executing a standardization algorithm, (i) an identification number, (ii) timestamp data, or (iii) event data from the first sample and the second sample; generating, by the one or more processors, a set of standardized samples comprising the extracted data from the first sample and the second sample, the set of standardized samples being formatted in accordance with a standardized format; and determining, by the one or more processors, the event combinations based on the set of standardized samples.

Example 12

The computer-implemented method of any of examples 1-11, wherein the machine-learned model includes an unsupervised decision tree model and a trained GBM.

Example 13

The computer-implemented method of any of examples 1-12, wherein the data object includes (i) a longest shared state sequence between the sample and at least one other sample within the cluster, (ii) metrics corresponding to the cluster, or (iii) a sample size associated with the cluster.

Example 14

A system comprising: one or more processors; and at least one memory storing processor-executable instructions that, when executed by the one or more processors, cause the one or more processors to perform operations comprising: applying a feature generation algorithm to one or more states that represent event combinations associated with one or more samples, wherein applying the feature generation algorithm includes: determining a state sequence associated with a sample of the one or more samples that satisfies an occurrence threshold, the state sequence including a state from the one or more states, and generating one or more timing features for the state sequence; clustering, by executing a machine-learned model, the sample associated with the state sequence into a cluster of a set of clusters based on the state sequence and the one or more timing features; and generating a data object indicating one or more outcomes associated with the cluster that includes the sample.

Example 15

The system of example 14, wherein the machine-learned model is an unsupervised decision tree model, wherein the state sequence is included within a set of state sequences determined by the feature generation algorithm as satisfying the occurrence threshold, and wherein clustering the sample further comprises: iteratively determining whether the sample includes one or more state sequences that (i) include a larger number of states than at least one other state sequence included in the set of state sequences and (ii) occur more frequently within the set of states than at least one other state sequence included in the set of state sequences; determining that: a node of the unsupervised decision tree model comprising the sample satisfies a size threshold, or an occurrence frequency, within the set of states, of remaining state sequences in the set of state sequences included in at least one sample within the node that have not been evaluated as part of the iterative determining fails to satisfy a sequence frequency threshold; and clustering, based on the determining, the sample into the cluster of the set of clusters that corresponds with the node.

Example 16

The system of example 15, wherein the processor-executable instructions, when executed by the one or more processors, further cause the one or more processors to perform operations comprising: iteratively applying a density-based clustering algorithm to (i) samples comprising the node and (ii) timing features of the one or more state sequences evaluated as part of the iterative determining to generate one or more sets of subclusters, wherein iterative applications of the density-based clustering algorithm utilize one or more unique hyperparameter combinations; determining, for the one or more sets of subclusters, a silhouette score indicating a match quality of the sample to one or more subclusters; and clustering the sample into a subcluster of the one or more subclusters based on a set of subclusters corresponding to a highest silhouette score.

Example 17

The system of any of examples 14-16, wherein the machine-learned model is a gradient boosting machine (GBM) model, wherein the state sequence is included within a set of state sequences determined by the feature generation algorithm as satisfying the occurrence threshold, wherein the one or more timing features are included within a set of timing features generated by the feature generation algorithm, and wherein clustering the sample further comprises: training the GBM using (i) the set of state sequences, (ii) the set of timing features, and (iii) one or more labels associated with historical outcomes, wherein the GBM is trained to output an outcome of interest likelihood for the sample; and stratifying, based on the outcome of interest likelihood, the sample into a bin of a set of bins associated with outcome of interest likelihoods, the bin corresponding with the cluster of the set of clusters, wherein boundaries of the set of bins are based on: a predetermined range of outcome of interest likelihood values, or one or more local minima of a distribution of the outcome of interest likelihood values.

Example 18

The system of example 17, wherein the GBM comprises one or more decision trees, wherein the one or more samples have associated decision paths along the one or more decision trees, and wherein the processor-executable instructions, when executed by the one or more processors, further cause the one or more processors to perform operations comprising: determining a listing of terminal nodes for the one or more decision trees; determining a set of pairwise distances between the terminal nodes, wherein a pairwise distance of the set of pairwise distances represents a fraction of decision paths along a decision tree of the one or more decision trees not shared by a first decision path leading to a first terminal node and a second decision path leading to a second terminal node; and storing the listing of terminal nodes and the set of pairwise distances in a storage location.

Example 19

The system of example 18, wherein the processor-executable instructions, when executed by the one or more processors, further cause the one or more processors to perform operations comprising: querying the storage location to determine pairwise distances between the sample and one or more other samples included in the bin of the one or more bins; iteratively applying a density-based clustering algorithm to (i) samples included in the bin of the one or more bins and (ii) the pairwise distances to generate one or more sets of subclusters, wherein iterative applications of the density-based clustering algorithm utilize one or more unique hyperparameter combinations; determining, for the one or more sets of subclusters, a silhouette score indicating a match quality of the sample to one or more subclusters; and clustering the sample into a subcluster of the one or more subclusters based on a set of subclusters corresponding to a highest silhouette score.

Example 20

One or more non-transitory computer-readable media storing processor-executable instructions that, when executed by one or more processors, cause the one or more processors to perform operations comprising: applying a feature generation algorithm to one or more states that represent event combinations associated with one or more samples, wherein applying the feature generation algorithm includes: determining a state sequence associated with a sample of the one or more samples that satisfies an occurrence threshold, the state sequence including a state from the one or more states, and generating one or more timing features for the state sequence; clustering, by executing a machine-learned model, the sample associated with the state sequence into a cluster of a set of clusters based on the state sequence and the one or more timing features; and generating a data object indicating one or more outcomes associated with the cluster that includes the sample.

Example 21

The computer-implemented method of Example 4, wherein the training is performed by the one or more processors.

Example 22

The computer-implemented method of Example 4, wherein: the one or more processors are included in a first computing entity; and the training is performed by one or more processors included in a second computing entity.

Additional Considerations

Throughout this specification, components, operations, or structures described as a single instance may be implemented as multiple instances. Although individual operations of one or more methods (or processes, techniques, routines, etc.) are illustrated and described as separate operations, two or more of the individual operations may be performed concurrently or otherwise in parallel, and nothing requires that the operations be performed in the order illustrated. Structures and functionality (e.g., operations, steps, blocks) presented as separate components in example configurations may be implemented as a combined structure, functionality, or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, operations, blocks, or instructions. These may constitute and/or be implemented by software (e.g., code embodied on a non-transitory, machine-readable medium), hardware, or a combination thereof. In hardware, the routines, etc., may represent tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware component that operates to perform certain operations as described herein.

In various embodiments, a hardware component may be implemented mechanically or electronically. For example, a hardware component may comprise dedicated circuitry or logic that is permanently configured (e.g., as a special-purpose processor, such as a field programmable gate array (FPGA) or an application-specific integrated circuit (ASIC)) to perform certain operations. A hardware component may also or instead comprise programmable logic or circuitry (e.g., as encompassed within one or more general-purpose processors and/or other programmable processor(s)) that is temporarily configured by software to perform certain operations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where the hardware components include a general-purpose processor configured using software, the general-purpose processor may be configured as respective different hardware components at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple of such hardware components exist contemporaneously, communications may be achieved through signal transmission (e.g., over appropriate circuits and buses) that connect the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

As noted above, the various operations of example methods (or processes, techniques, routines, etc.) described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Moreover, each operation of processes illustrated as logical flow graphs may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The terms "coupled" and "connected," along with their derivatives, may be used. In particular embodiments, "connected" may be used to indicate that two or more elements are in direct physical or electrical contact with each other, although the context in the description may dictate otherwise when it is apparent that two or more elements are not in direct physical or electrical contact. "Coupled" may mean that two or more elements are in direct physical or electrical contact. However, "coupled" may also mean that two or more elements are not in direct contact with each other, yet still co-operate, transmit between, or interact with each other.

An algorithm may be considered to be a self-consistent sequence of acts or operations leading to a desired result. These include physical manipulations of physical quantities. Usually, though not necessarily, these quantities take the form of electrical, magnetic, or optical signals capable of being stored, transferred, combined, compared, and otherwise manipulated. These signals are commonly referred to as bits, values, elements, symbols, characters, terms, numbers, flags, or the like. It should be understood, however, that all of these and similar terms are to be associated with the appropriate physical quantities and are merely convenient labels applied to these quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "one embodiment," "an embodiment," "in some examples," or variations thereof means that a particular element, feature, structure, characteristic, operation, or the like described in connection with the embodiment is included in at least one embodiment, but not every embodiment necessarily includes the particular element, feature, structure, characteristic, operation, or the like. Different instances of such a reference in various places in the specification do not necessarily all refer to the same embodiment, although they may in some cases. Moreover, different instances of such a reference may describe elements, features, structures, characteristics, operations, or the like be combined in any manner as an embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless the context of use clearly indicates otherwise, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "set" is intended to mean a collection of elements and can be a null set (i.e., a set containing zero elements) or may comprise one, two, or more elements. A "subset" is intended to mean a collection of elements that are all elements of a set, but that does not include other elements of the set. A first subset of a set may comprise zero, one, or more elements that are also elements of a second subset of the set. The first subset may be said to be a subset of the second subset if all the elements of the first subset are elements of the second subset, while also being a subset of the set. However, if all the elements of the second subset are also elements of the first subset (in addition to all the elements of the first subset being elements of the second subset), the first subset and the second subset are a single subset/not distinct.

For the purposes of the present disclosure, the term "a" or "an" entity refers to one or more of that entity. As such, the terms "a" or "an", "one or more", and "at least one" can be used interchangeably herein unless explicitly contradicted by the specification using the word "only one" or similar. For example, "a first element" may functionally be interpreted as "a first one or more elements" or a "first at least one element." Unless otherwise apparent from the context of use, reference in the present disclosure to a same set of "one or more processors" (or a same "plurality of processors," etc.) performing multiple operations can encompass implementations in which performance of the operations is divided among the processor(s) in any suitable way. For example, "generating, by one or more processors, X; and generating, by the one or more processors, Y" can encompass: (1) implementations in which a first subset of the processors (e.g., in a first computing device) generates X and an entirely distinct, second subset of the processors (e.g., in a different, second computing device) independently generates Y; (2) implementations in which one or more or all of the processor(s) (e.g., one or multiple processors in the same device, or multiple processors distributed among multiple devices) contribute to the generation of X and/or Y; and (3) other variations. This may similarly be applied to any other component or feature similarly recited (e.g., as "a component", "a feature", "one or more components", "one or more features", "a plurality of components", "a plurality of features"). Moreover, the performance of certain of the operations may be distributed among the one or more components, not only residing within a single machine, but deployed across a number of machines. The set of components may be located in a single geographic location (e.g., within a home environment, an office environment, a cloud environment). In other example embodiments, the set of components may be distributed across two or more geographic locations. Further, "a machine-learned model", equivalent terms (e.g., "machine-learned model," "machine-learning model," "machine-learned component", "artificial intelligence", "artificial intelligence component"), or species thereof (e.g., "a large language model", "a neural network") may include a single machine-learned model or multiple machine-learned models, such as a pipeline comprising two or more machine-learned models arranged in series and/or parallel, an agentic framework of machine-learned models, or the like.

An "artificial intelligence" or "artificial intelligence component" may comprise a machine-learned model. A machine-learned model may comprise a hardware and/or software architecture having structural hyperparameters defining the model's architecture and/or one or more parameters (e.g., coefficient(s), weight(s), biase(s), activation function(s) and/or action function type(s) in examples where the activation function and/or function type is determined as part of training, clustering centroid(s)/medoid(s), partition(s), number of trees, tree depth, split parameters) determined as a result of training the machine-learned model based at least in part on training hyperparameters (e.g., for supervised, semi-supervised, and reinforcement learning models) and/or by iteratively operating the machine-learned model according to the training hyperparameters (e.g., for unsupervised machine-learned models).

In some examples, structural hyperparameter(s) may define component(s) of the model's architecture and/or their configuration/order, such as, for example, the configuration/order specifying which input(s) are provided to one component and which output(s) of that component are provided as input to other component(s) of the machine-learned model; a number, type, and/or configuration of component(s) per layer; a number of layers of the model; a number and/or type of input nodes in an input layer of the model; a number and/or type of nodes in a layer; a number and/or type of output nodes of an output layer of the model; component dimension (e.g., input size versus output size); a number of trees; a maximum tree depth; node split parameters; minimum number of samples in a leaf node of a tree; and/or the like. The component(s) of the model may comprise one or more activation functions and/or activation function type(s) (e.g., gated linear unit (GLU), such as a rectified linear unit (ReLU), leaky RELU, Gaussian error linear unit (GELU), Swish, hyperbolic tangent), one or more attention mechanism and/or attention mechanism types (e.g., self-attention, cross-attention), nodes and split indications and/or probabilities in a decision tree, and/or various other component(s) (e.g., adding and/or normalization layer, pooling layer, filter). Various combinations of any these components (as defined by the structural hyperparameter(s)) may result in different types of model architectures, such as a transformer-based machine-learned model (e.g., encoder-only model(s), encoder-decoder model(s), decoder-only models, generative pre-trained transformer(s) (GPT(s))), neural network(s), multi-layer perceptron(s), Kolmogorov-Arnold network(s), clustering algorithm(s), support vector machine(s), gradient boosting machine(s), and/or the like. The structural parameters and components a machine-learned model comprises may vary depending on the type of machine-learned model.

Training hyperparameter(s) may be used as part of training or otherwise determining the machine-learned model. In some examples, the training hyperparameter(s), in addition to the training data and/or input data, may affect determining the parameter(s) of the target machine-learned model. Using a different set of training hyperparameters to train two machine-learned models that have the same architecture (i.e., the same structural hyperparameters) and using the same training data may result in the parameters of the first machine-learned model differing from the parameters of the second machine-learned model. Despite having the same architecture and having been trained using the same training data, such machine-learned models may generate different outputs from each other, given the same input data. Accordingly, accuracy, precision, recall, and/or bias may vary between such machine-learned models.

In some examples, training hyperparameter(s) may include a train-test split ratio, activation function and/or activation function type (e.g., in examples like Kolmogorov-Arnold networks (KANs) where the activation function type is determined as part of training from an available set of activation functions and/or limits on the activation function parameters specified by the training hyperparameters), training stage(s) (e.g., using a first set of hyperparameters for a first epoch of training, a second set of hyperparameters for a second epoch of training), a batch size and/or number of batches of data in a training epoch, a number of epochs of training, the loss function used (e.g., L1, L2, Huber, Cauchy, cross entropy), the component(s) of the machine-learned model that are altered using the loss for a particular batch or during a particular epoch of training (e.g., some components may be "frozen," meaning their parameters are not altered based on the loss), learning rate, learning rate optimization algorithm type (e.g., gradient descent, adaptive, stochastic) used to determine an alteration to one or more parameters of one or more components of the machine-learned model to reduce the loss determined by the loss function, learning rate scheduling, and/or the like.

In some examples, the structural hyperparameters and/or the training hyperparameters may be determined by a hyperparameter optimization algorithm or based on user input, such as a software component written by a user or generated by a machine-learned model. The machine-learned model may include any type of model configured, trained, and/or the like to generate a prediction output for a model input. In some examples, any of the logic, component(s), routines, and/or the like discussed herein may be implemented as a machine-learned model.

The machine-learned model may include one or more of any type of machine-learned model including one or more supervised, unsupervised, semi-supervised, and/or reinforcement learning models. Training a machine-learned model may comprise altering one or more parameters of the machine-learned model (e.g., using a loss optimization algorithm) to reduce a loss. Depending on whether the machine-learned model is supervised, semi-supervised, unsupervised, etc. this loss may be determined based at least in part on a difference between an output generated by the model and ground truth data (e.g., a label, an indication of an outcome that resulted from a system using the output), a cost function, a fit of the parameter(s) to a set of data, a fit of an output to a set of data, and/or the like. In some examples, determining an output by a machine-learned model may comprise executing a set of inference operations executed by the machine-learned model according to the target machine-learned model's parameter(s) and structural hyperparameter(s) and using/operating on a set of input data.

Moreover, any discussion of receiving data associated with an individual that may be protected, confidential, or otherwise sensitive information, is understood to have been preceded by transmitting a notice of use of the data to a computing device, account, or other identifier (collectively, "identifier") associated with the individual, receiving an indication of authorization to use the data from the identifier, and/or providing a mechanism by which a user may cause use of the data to cease or a copy of the data to be provided to the user.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method comprising:

generating, by one or more processors, one or more states based on a candidate set of states corresponding to a highest silhouette score and a minimum quantity of samples with a corresponding event combination failing to satisfy a combination frequency threshold, the one or more states representing event combinations associated with one or more samples;

applying, by the one or more processors, a feature generation algorithm to the one or more states, wherein applying the feature generation algorithm includes:

determining a state sequence associated with a sample of the one or more samples that satisfies an occurrence threshold, the state sequence including a state from the one or more states, and generating one or more timing features for the state sequence;

clustering, by the one or more processors executing a machine-learned model, the sample associated with the state sequence into a cluster of a set of clusters based on the state sequence and the one or more timing features; and generating, by the one or more processors for the sample, a data object indicating one or more outcomes associated with the cluster that includes the sample.

2. The computer-implemented method of claim 1, wherein the machine-learned model is an unsupervised decision tree model, wherein the state sequence is included within a set of state sequences determined by the feature generation algorithm as satisfying the occurrence threshold, and wherein clustering the sample further comprises:

iteratively determining, by the one or more processors, whether the sample includes one or more state sequences that (i) include a larger number of states than at least one other state sequence included in the set of state sequences and (ii) occur more frequently within a set of states of the one or more states than at least one other state sequence included in the set of state sequences;

determining, by the one or more processors, that:

a node of the unsupervised decision tree model comprising the sample satisfies a size threshold, or an occurrence frequency, within the set of states, of remaining state sequences in the set of state sequences included in at least one sample within the node that have not been evaluated as part of the iterative determining fails to satisfy a sequence frequency threshold; and clustering, by the one or more processors and based on the determining, the sample into the cluster of the set of clusters that corresponds with the node.

3. The computer-implemented method of claim 2, further comprising:

iteratively applying, by the one or more processors, a density-based clustering algorithm to (i) samples comprising the node and (ii) timing features of the one or more state sequences evaluated as part of the iterative determining to generate one or more sets of subclusters, wherein iterative applications of the density-based clustering algorithm utilize one or more unique hyperparameter combinations;

determining, by the one or more processors for the one or more sets of subclusters, a silhouette score indicating a match quality of the sample to one or more subclusters; and clustering, by the one or more processors, the sample into a subcluster of the one or more subclusters based on a set of subclusters corresponding to a highest silhouette score.

4. The computer-implemented method of claim 1, wherein the machine-learned model is a gradient boosting machine (GBM) model, wherein the state sequence is included within a set of state sequences determined by the feature generation algorithm as satisfying the occurrence threshold, wherein the one or more timing features are included within a set of timing features generated by the feature generation algorithm, and wherein clustering the sample further comprises:

training, by the one or more processors, the GBM using (i) the set of state sequences, (ii) the set of timing features, and (iii) one or more labels associated with historical outcomes, wherein the GBM is trained to output an outcome of interest likelihood for the sample; and stratifying, by the one or more processors based on the outcome of interest likelihood, the sample into a bin of a set of bins associated with outcome of interest likelihoods, the bin corresponding with the cluster of the set of clusters, wherein boundaries of the set of bins are based on:

a predetermined range of outcome of interest likelihood values, or one or more local minima of a distribution of the outcome of interest likelihood values.

5. The computer-implemented method of claim 4, wherein the GBM comprises one or more decision trees, wherein the one or more samples have associated decision paths along the one or more decision trees, and wherein the computer-implemented method further comprises:

determining, by the one or more processors, a listing of terminal nodes for the one or more decision trees;

determining, by the one or more processors, a set of pairwise distances between terminal nodes of the listing of terminal nodes, wherein a pairwise distance of the set of pairwise distances represents a fraction of decision paths along a decision tree of the one or more decision trees not shared by a first decision path leading to a first terminal node and a second decision path leading to a second terminal node; and storing, by the one or more processors, the listing of terminal nodes and the set of pairwise distances in a storage location.

6. The computer-implemented method of claim 5, further comprising:

querying, by the one or more processors, the storage location to determine pairwise distances between the sample and one or more other samples included in the bin of the set of bins;

iteratively applying, by the one or more processors, a density-based clustering algorithm to (i) samples included in the bin of the set of bins and (ii) the pairwise distances to generate one or more sets of subclusters, wherein iterative applications of the density-based clustering algorithm utilize one or more unique hyperparameter combinations;

determining, by the one or more processors for the one or more sets of subclusters, a silhouette score indicating a match quality of the sample to one or more subclusters; and clustering, by the one or more processors, the sample into a subcluster of the one or more subclusters based on a set of subclusters corresponding to a highest silhouette score.

7. The computer-implemented method of claim 1, wherein the feature generation algorithm comprises a pattern mining method, and wherein applying the feature generation algorithm further comprises:

applying, by the one or more processors, the pattern mining method to a set of states of the one or more states to determine whether one or more state sequences from the set of states satisfies the occurrence threshold, the set of states corresponding to the sample;

determining, by the one or more processors, that the state sequence satisfies the occurrence threshold based on the state sequence occurring within one or more other sets of states corresponding to one or more other samples of the one or more samples; and generating, by the one or more processors, the one or more timing features associated with the state sequence based on timestamp data of event combinations associated with the state sequence.

8. The computer-implemented method of claim 7, wherein the one or more timing features includes at least one of: (i) an initial appearance value, (ii) a frequency value, or (iii) an average duration value.

9. The computer-implemented method of claim 1, wherein the event combinations associated with the one or more samples comprise one or more events, and wherein the computer-implemented method further comprises:

determining, by the one or more processors based on the event combinations, a unique event combination of the one or more events;

generating, by the one or more processors executing an encoder, an embedding for the unique event combination;

applying, by the one or more processors, a dimension reduction algorithm to the embedding to generate a reduced-dimension embedding representing the unique event combination; and applying, by the one or more processors, a density-based clustering algorithm to the reduced-dimension embedding and one or more other reduced-dimension embeddings representing other unique event combinations to generate the one or more states.

10. The computer-implemented method of claim 9, further comprising:

determining, by the one or more processors, a cosine distance of the reduced-dimension embedding from the one or more other reduced-dimension embeddings;

iteratively applying, by the one or more processors, the density-based clustering algorithm to (i) the reduced-dimension embedding and (ii) the one or more other reduced-dimension embeddings to generate one or more candidate sets of states, wherein iterative applications of the density-based clustering algorithm utilize one or more unique hyperparameter combinations; and determining, by the one or more processors for the one or more candidate sets of states, (i) a silhouette score indicating a match quality of the reduced-dimension embedding to a candidate state and (ii) a quantity of samples with a corresponding event combination failing to satisfy a combination frequency threshold.

11. The computer-implemented method of claim 1, further comprising:

receiving, at the one or more processors, sample data comprising a first sample formatted in accordance with a first format and a second sample formatted in accordance with a second format that is different from the first format;

extracting, by the one or more processors executing a standardization algorithm, (i) an identification number, (ii) timestamp data, or (iii) event data from the first sample and the second sample;

generating, by the one or more processors, a set of standardized samples comprising the extracted data from the first sample and the second sample, the set of standardized samples being formatted in accordance with a standardized format; and determining, by the one or more processors, the event combinations based on the set of standardized samples.

12. The computer-implemented method of claim 1, wherein the machine-learned model includes an unsupervised decision tree model and a trained GBM.

13. The computer-implemented method of claim 1, wherein the data object includes (i) a longest shared state sequence between the sample and at least one other sample within the cluster, (ii) metrics corresponding to the cluster, or (iii) a sample size associated with the cluster.

14. A system comprising:

one or more processors; and at least one memory storing processor-executable instructions that, when executed by the one or more processors, cause the one or more processors to perform operations comprising:

generating one or more states representing event combinations associated with one or more samples based on a candidate set of states corresponding to a highest silhouette score and a minimum quantity of samples with a corresponding event combination failing to satisfy a combination frequency threshold;

applying a feature generation algorithm to the one or more states, wherein applying the feature generation algorithm includes:

determining a state sequence associated with a sample of the one or more samples that satisfies an occurrence threshold, the state sequence including a state from the one or more states, and generating one or more timing features for the state sequence;

clustering, by executing a machine-learned model, the sample associated with the state sequence into a cluster of a set of clusters based on the state sequence and the one or more timing features; and generating a data object indicating one or more outcomes associated with the cluster that includes the sample.

15. The system of claim 14, wherein the machine-learned model is an unsupervised decision tree model, wherein the state sequence is included within a set of state sequences determined by the feature generation algorithm as satisfying the occurrence threshold, and wherein clustering the sample further comprises:

iteratively determining whether the sample includes one or more state sequences that (i) include a larger number of states than at least one other state sequence included in the set of state sequences and (ii) occur more frequently within a set of states of the one or more states than at least one other state sequence included in the set of state sequences;

determining that:

a node of the unsupervised decision tree model comprising the sample satisfies a size threshold, or an occurrence frequency, within the set of states, of remaining state sequences in the set of state sequences included in at least one sample within the node that have not been evaluated as part of the iterative determining fails to satisfy a sequence frequency threshold; and clustering, based on the determining, the sample into the cluster of the set of clusters that corresponds with the node.

16. The system of claim 15, wherein the processor-executable instructions, when executed by the one or more processors, further cause the one or more processors to perform operations comprising:

iteratively applying a density-based clustering algorithm to (i) samples comprising the node and (ii) timing features of the one or more state sequences evaluated as part of the iterative determining to generate one or more sets of subclusters, wherein iterative applications of the density-based clustering algorithm utilize one or more unique hyperparameter combinations;

determining, for the one or more sets of subclusters, a silhouette score indicating a match quality of the sample to one or more subclusters; and clustering the sample into a subcluster of the one or more subclusters based on a set of subclusters corresponding to a highest silhouette score.

17. The system of claim 14, wherein the machine-learned model is a gradient boosting machine (GBM) model, wherein the state sequence is included within a set of state sequences determined by the feature generation algorithm as satisfying the occurrence threshold, wherein the one or more timing features are included within a set of timing features generated by the feature generation algorithm, and wherein clustering the sample further comprises:

training the GBM using (i) the set of state sequences, (ii) the set of timing features, and (iii) one or more labels associated with historical outcomes, wherein the GBM is trained to output an outcome of interest likelihood for the sample; and stratifying, based on the outcome of interest likelihood, the sample into a bin of a set of bins associated with outcome of interest likelihoods, the bin corresponding with the cluster of the set of clusters, wherein boundaries of the set of bins are based on:

a predetermined range of outcome of interest likelihood values, or one or more local minima of a distribution of the outcome of interest likelihood values.

18. The system of claim 17, wherein the GBM comprises one or more decision trees, wherein the one or more samples have associated decision paths along the one or more decision trees, and wherein the processor-executable instructions, when executed by the one or more processors, further cause the one or more processors to perform operations comprising:

determining a listing of terminal nodes for the one or more decision trees;

determining a set of pairwise distances between terminal nodes of the listing of terminal nodes, wherein a pairwise distance of the set of pairwise distances represents a fraction of decision paths along a decision tree of the one or more decision trees not shared by a first decision path leading to a first terminal node and a second decision path leading to a second terminal node; and storing the listing of terminal nodes and the set of pairwise distances in a storage location.

19. The system of claim 18, wherein the processor-executable instructions, when executed by the one or more processors, further cause the one or more processors to perform operations comprising:

querying the storage location to determine pairwise distances between the sample and one or more other samples included in the bin of the set of bins;

iteratively applying a density-based clustering algorithm to (i) samples included in the bin of the set of bins and (ii) the pairwise distances to generate one or more sets of subclusters, wherein iterative applications of the density-based clustering algorithm utilize one or more unique hyperparameter combinations;

determining, for the one or more sets of subclusters, a silhouette score indicating a match quality of the sample to one or more subclusters; and clustering the sample into a subcluster of the one or more subclusters based on a set of subclusters corresponding to a highest silhouette score.

20. One or more non-transitory computer-readable media storing processor-executable instructions that, when executed by one or more processors, cause the one or more processors to perform operations comprising:

generating one or more states representing event combinations associated with one or more samples based on a candidate set of states corresponding to a highest silhouette score and a minimum quantity of samples with a corresponding event combination failing to satisfy a combination frequency threshold;

applying a feature generation algorithm to the one or more states, wherein applying the feature generation algorithm includes:

determining a state sequence associated with a sample of the one or more samples that satisfies an occurrence threshold, the state sequence including a state from the one or more states, and generating one or more timing features for the state sequence;

clustering, by executing a machine-learned model, the sample associated with the state sequence into a cluster of a set of clusters based on the state sequence and the one or more timing features; and generating a data object indicating one or more outcomes associated with the cluster that includes the sample.

* * * * *